United States Patent
Hirosawa

(10) Patent No.: US 9,268,179 B2
(45) Date of Patent: Feb. 23, 2016

(54) LIQUID CRYSTAL DISPLAY DEVICE UTILIZING A LATERAL ELECTRIC FIELD

(71) Applicant: Japan Display Inc., Minato-ku (JP)

(72) Inventor: Jin Hirosawa, Saitama (JP)

(73) Assignee: Japan Display Inc., Minato-ku (JP)

( * ) Notice: Subject to any disclaimer, the term of this patent is extended or adjusted under 35 U.S.C. 154(b) by 225 days.

(21) Appl. No.: 13/910,363

(22) Filed: Jun. 5, 2013

(65) Prior Publication Data

US 2013/0329156 A1 Dec. 12, 2013

(30) Foreign Application Priority Data

Jun. 6, 2012 (JP) ................................. 2012-128716

(51) Int. Cl.
*G02F 1/1343* (2006.01)
*G02F 1/1362* (2006.01)

(52) U.S. Cl.
CPC .... *G02F 1/134363* (2013.01); *G02F 1/136213* (2013.01); *G02F 1/134309* (2013.01); *G02F 2001/134318* (2013.01); *G02F 2001/134372* (2013.01); *G02F 2001/134381* (2013.01); *G02F 2001/136218* (2013.01)

(58) Field of Classification Search
CPC .............. G02F 1/134309; G02F 2001/134318; G02F 2001/134372; G02F 2001/136218
See application file for complete search history.

(56) References Cited

U.S. PATENT DOCUMENTS

| | | | |
|---|---|---|---|
| 6,266,116 B1 | 7/2001 | Ohta et al. | |
| 7,751,014 B2 * | 7/2010 | Oka | G02F 1/134363 349/114 |
| 7,940,359 B2 * | 5/2011 | Lee | 349/138 |
| 7,999,880 B2 * | 8/2011 | Chai et al. | 349/43 |
| 8,228,478 B2 * | 7/2012 | Maede | G02F 1/134363 349/110 |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 14/063,502, filed Oct. 25, 2013, Hirosawa.

(Continued)

*Primary Examiner* — Paisley L Arendt
(74) *Attorney, Agent, or Firm* — Oblon, McClelland, Maier & Neustadt, L.L.P.

(57) ABSTRACT

According to one embodiment, a liquid crystal display device includes a first substrate including a gate line, a source line, a switching element, a first pixel electrode electrically connected to the switching element, an interlayer insulation film covering the first pixel electrode, a second pixel electrode which is located on the interlayer insulation film, is electrically connected to the first pixel electrode and includes a main pixel electrode, and a first main common electrode extending along the source line, the first pixel electrode including an edge portion which is located closer to the source line and the first main common electrode than to the main pixel electrode, a second substrate, and a liquid crystal layer.

6 Claims, 17 Drawing Sheets

(56) References Cited

U.S. PATENT DOCUMENTS

| | | |
|---|---|---|
| 2008/0180590 A1 | 7/2008 | Lee et al. |
| 2008/0180623 A1 | 7/2008 | Lee et al. |
| 2008/0186439 A1 | 8/2008 | Kwon et al. |
| 2011/0234947 A1* | 9/2011 | Hirosawa ............... 349/96 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2000-56324 A | 2/2000 |
| JP | 2000-81641 | 3/2000 |
| JP | 2005-3802 | 1/2005 |
| JP | 3644653 | 2/2005 |
| JP | 2005-242307 | 9/2005 |
| JP | 2005-352067 A | 12/2005 |
| JP | 2009-37154 A | 2/2009 |
| JP | 2009-109657 A | 5/2009 |
| JP | 2009-192822 | 8/2009 |
| JP | 2011-209454 | 10/2011 |

OTHER PUBLICATIONS

U.S. Appl. No. 14/469,967, filed Aug. 27, 2014, Hirosawa.
U.S. Appl. No. 13/897,757, filed May 20, 2013, Hirosawa.
U.S. Appl. No. 13/905,657, filed May 30, 2013, Morita, et al.
Office Action issued Sep. 29, 2015 in Japanese Patent Application No. 2012-128716 (with English language translation).

* cited by examiner

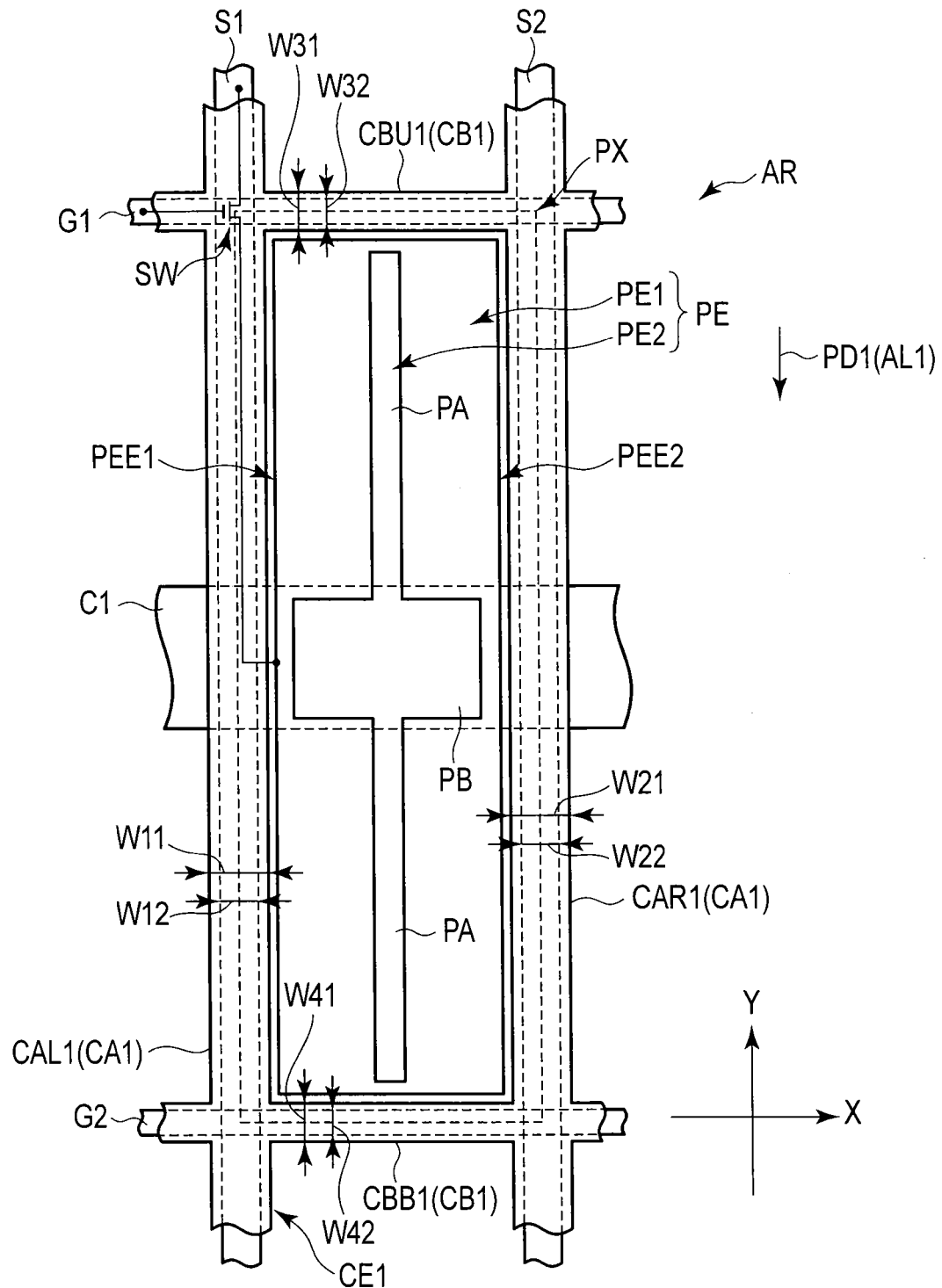
F I G. 2

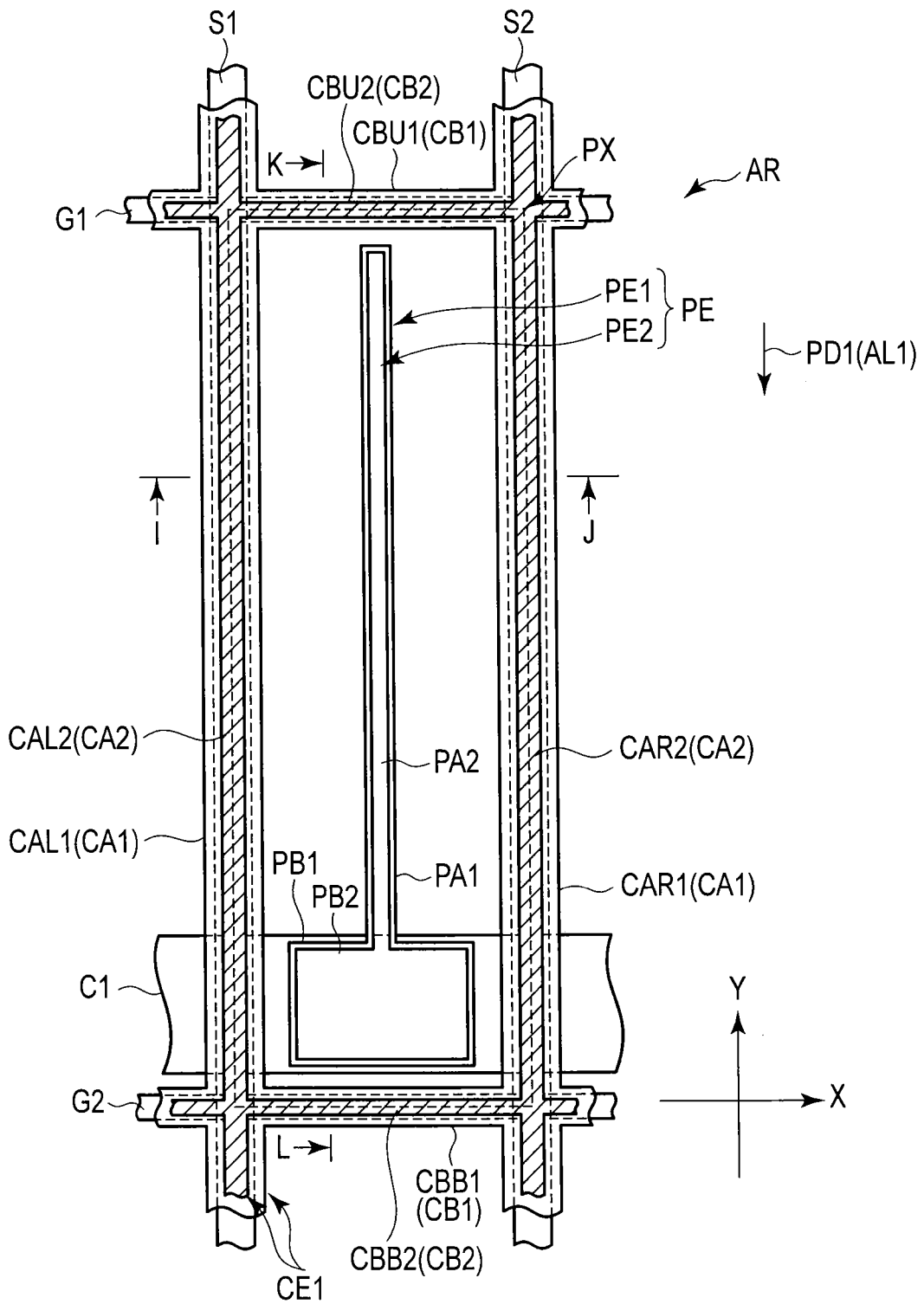
F I G. 11

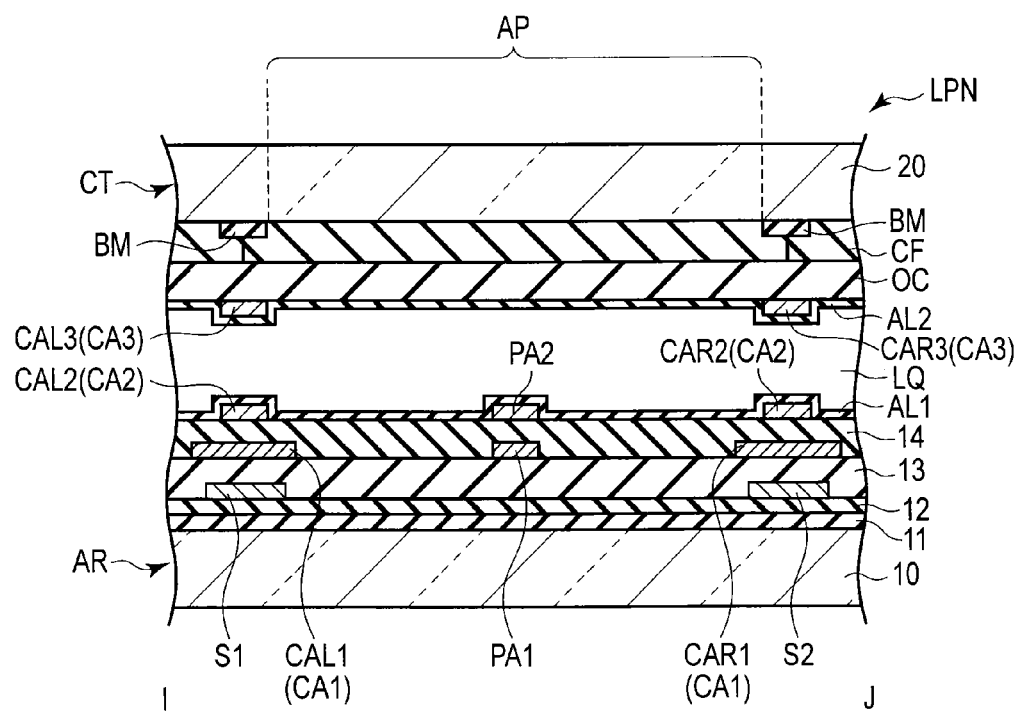
F I G. 12

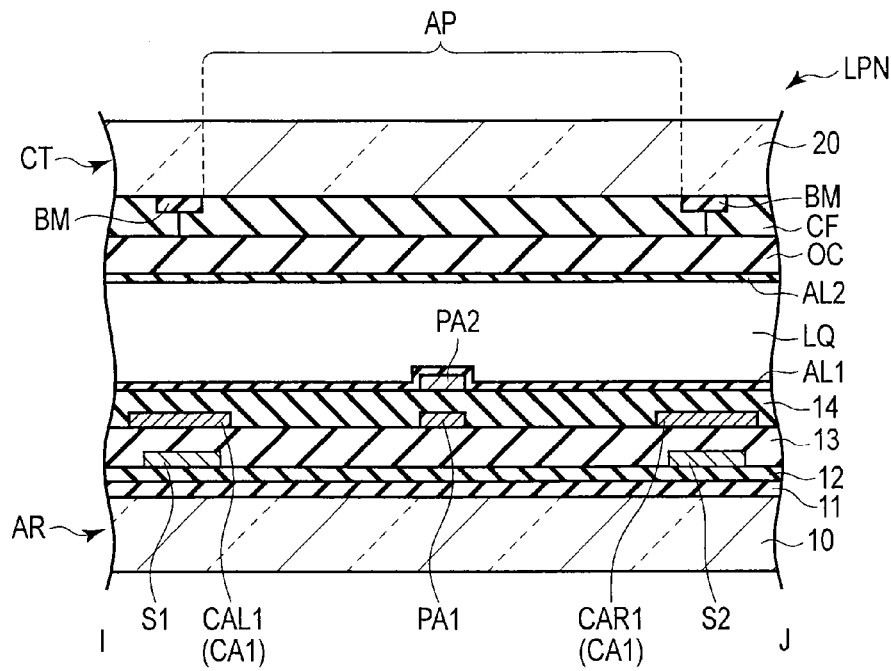
F I G. 20
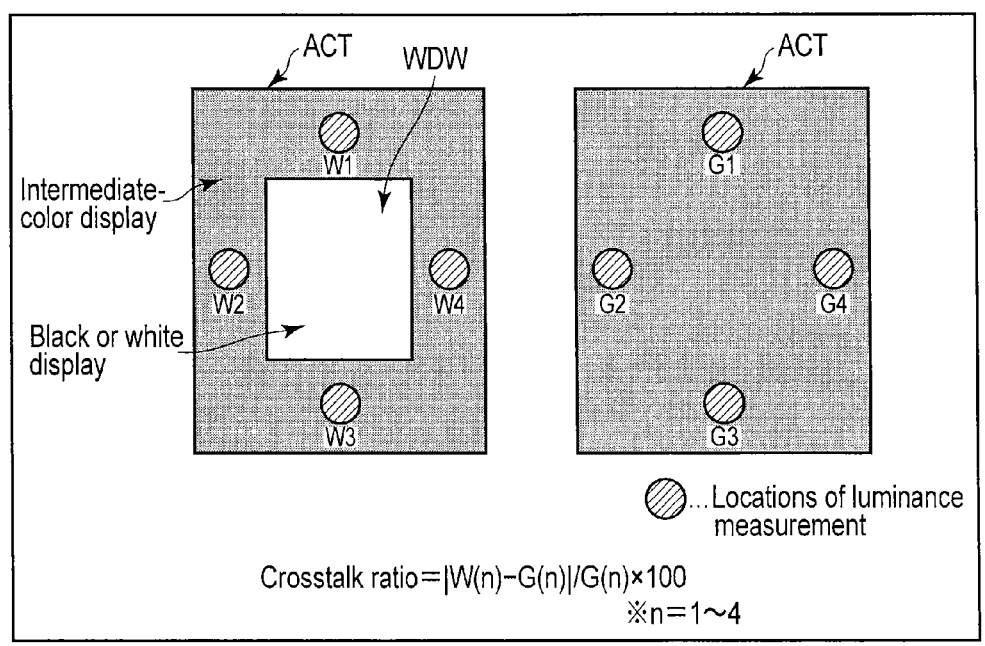
F I G. 21

LIQUID CRYSTAL DISPLAY DEVICE UTILIZING A LATERAL ELECTRIC FIELD

CROSS-REFERENCE TO RELATED APPLICATIONS

This application is based upon and claims the benefit of priority from Japanese Patent Application No. 2012-128716, filed Jun. 6, 2012, the entire contents of which are incorporated herein by reference.

FIELD

Embodiments described herein relate generally to a liquid crystal display device.

BACKGROUND

In recent years, in active matrix liquid crystal devices in which switching elements are incorporated in respective pixels, configurations, which make use of a lateral electric field (including a fringe electric field), such as an IPS (In-Plane Switching) mode or an FFS (Fringe Field Switching) mode, have been put to practical use. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate. In connection with the lateral electric field mode, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a plan view which schematically shows a first structure example of one pixel at a time when an array substrate shown in FIG. 1 is viewed from a counter-substrate side.

FIG. 11 is a plan view which schematically illustrates a third structure example of the pixel at a time when the array substrate shown in FIG. 1 is viewed from the counter-substrate side.

FIG. 12 is a cross-sectional view, taken along line I-J in FIG. 11, which shows, in a simplified fashion, a main part of a cross-sectional structure of a liquid crystal display panel shown in FIG. 11.

FIG. 20 is a cross-sectional view, taken along line I-J in FIG. 11, which shows, in a simplified fashion, a main part of another cross-sectional structure of the liquid crystal display panel shown in FIG. 11.

FIG. 21 is a view for explaining the definition of a crosstalk ratio which is introduced in the present embodiment.

DETAILED DESCRIPTION

Figure 1:
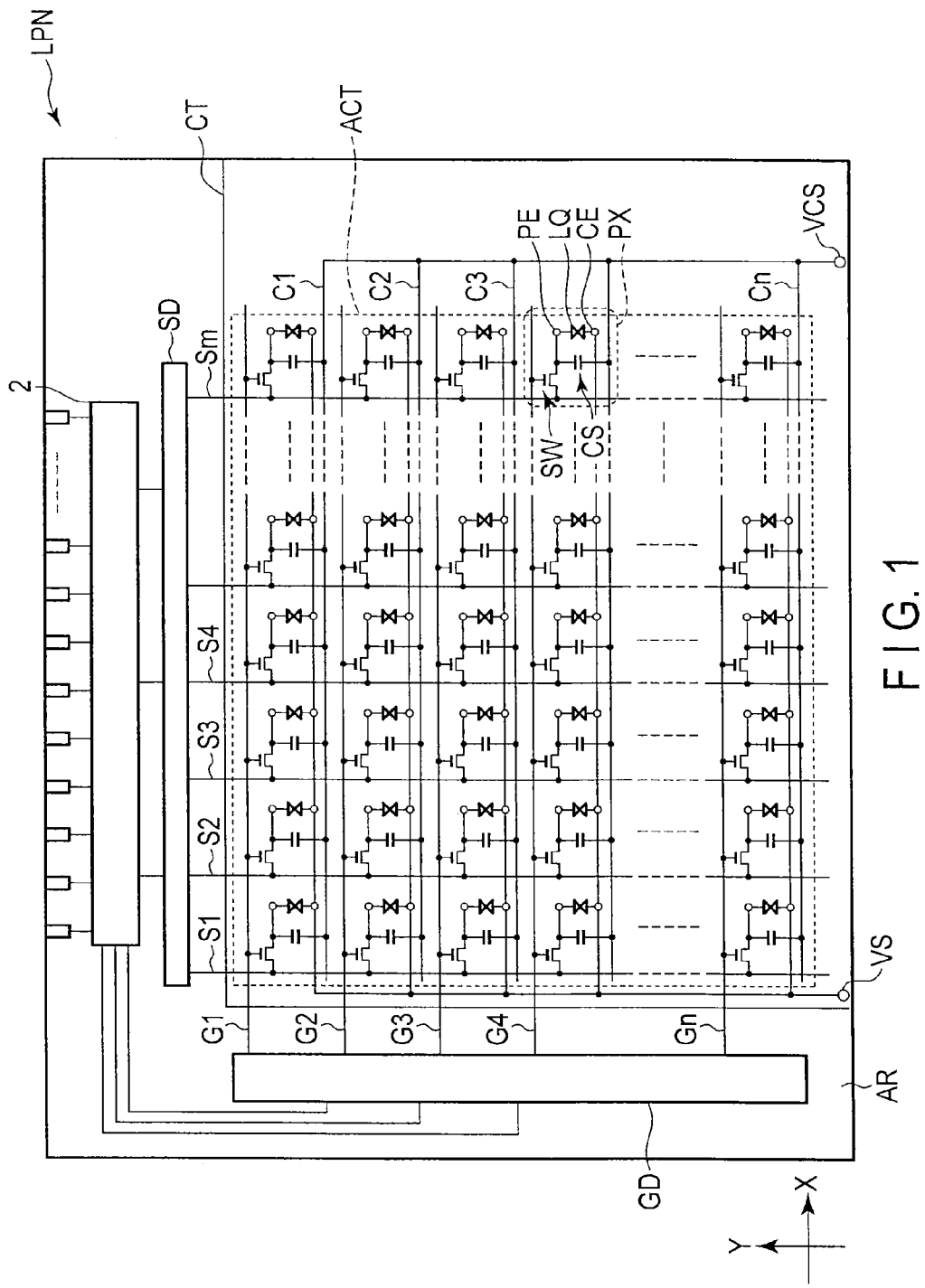
FIG. 1 is a view which schematically illustrates a structure and an equivalent circuit of a liquid crystal display device according to an embodiment.

In general, according to one embodiment, a liquid crystal display device includes: a first substrate including a gate line extending in a first direction, a source line extending in a second direction crossing the first direction, a switching element electrically connected to the gate line and the source line, a first pixel electrode electrically connected to the switching element, an interlayer insulation film covering the first pixel electrode, a second pixel electrode which is located on the interlayer insulation film, is electrically connected to the first pixel electrode and includes a main pixel electrode extending in the second direction, and a first main common electrode extending along the source line, the first pixel electrode including an edge portion which is located closer to the source line and the first main common electrode than to the main pixel electrode; a second substrate disposed to be opposed to the first substrate; and a liquid crystal layer held between the first substrate and the second substrate.

According to another embodiment, a liquid crystal display device includes: a first substrate including a gate line extending in a first direction, a source line extending in a second direction crossing the first direction, a switching element electrically connected to the gate line and the source line, a pixel electrode electrically connected to the switching element, a first main common electrode extending along the source line, an interlayer insulation film covering the first main common electrode, and a second main common electrode which is located on the interlayer insulation film, extends along the first main common electrode and has the same potential as the first main common electrode; a second substrate disposed to be opposed to the first substrate; and a liquid crystal layer held between the first substrate and the second substrate.

According to another embodiment, a liquid crystal display device includes: a first substrate including a gate line extending in a first direction, a source line extending in a second direction crossing the first direction, a switching element electrically connected to the gate line and the source line, a first pixel electrode electrically connected to the switching element, a first main common electrode which extends along the source line, has an electrode width which is greater than a line width of the source line and extends to the first pixel electrode side from a position overlapping the source line, an interlayer insulation film covering the first pixel electrode and the first main common electrode, and a second pixel electrode which is located on the interlayer insulation film, is electrically connected to the first pixel electrode and includes a main pixel electrode extending in the second direction; a second substrate including a third main common electrode which extends in the second direction, has the same potential as the first main common electrode and is located above the first main common electrode; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

The liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, gate lines G (G1 to Gn), storage capacitance lines C (C1 to Cn), and source lines S (S1 to Sm). The gate lines G correspond to signal lines which extend, for example, substantially linearly in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S correspond to signal lines which extend substantially linearly in the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR. The gate driver GD and source driver SD are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane (or a substrate major surface) which is defined by the first direction X and second direction Y (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrodes PE and common electrode CE may be formed of, for example, a transparent, electrically conductive material such as indium tin oxide (ITO) or indium zinc oxide (IZO), or may be formed of an opaque wiring material such as aluminum (Al), titanium (Ti), silver (Ag), molybdenum (Mo), tungsten (W), copper (Cu) or chromium (Cr).

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

Next, a first structure example of one pixel, which is disposed in the active area, is described.

FIG. 2 is a plan view which schematically shows the first structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a first alignment film AL1. In the example illustrated, the array substrate AR further includes a first common electrode CE1 which is a part of the common electrode CE.

The gate line G1 and gate line G2 are disposed with a distance in the second direction Y, and extend in the first direction X. The storage capacitance line C1 is disposed between the gate line G1 and gate line G2, and extends in the first direction X. In the example illustrated, the storage capacitance line C1 is located at a substantially middle point between the gate line G1 and the gate line G2. Specifically, the distance between the gate line G1 and storage capacitance line C1 in the second direction Y is substantially equal to the distance between the gate line G2 and storage capacitance line C1 in the second direction Y. The source line S1 and source line S2 are disposed with a distance in the first direction X, and extend in the second direction Y. The pixel electrode PE is disposed between the neighboring source line S1 and source line S2. In addition, the pixel electrode PE is disposed between the gate line G1 and gate line G2.

In the example illustrated, as indicated by a broken line in the Figure, the pixel PX corresponds to a grid-shaped area defined by the gate line G1, gate line G2, source line S1 and source line S2, and has a rectangular shape having a less length in the first direction X than in the second direction Y. The length of the pixel PX in the first direction X corresponds to the pitch between the source line S1 and source line S2 in the first direction X. The length of the pixel PX in the second direction Y corresponds to the pitch between the gate line G1 and gate line G2 in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line C1 is located at an upper side end portion, and is disposed to extend over a boundary between the pixel PX and a pixel neighboring on the upper side. The gate line G2 is located at a lower side end portion, and is disposed to extend over a boundary between the pixel PX and a pixel neighboring on the lower side. The storage capacitance line C1 is disposed at a substantially central part of the pixel PX.

The switching element SW, in the illustrated example, is electrically connected to the gate line C1 and source line S1. The switching element SW is provided at an intersection between the gate line G1 and source line S1, and includes a semiconductor layer (not shown). The semiconductor layer is formed of, for example, polysilicon, is located below the source line S1, crosses the gate line G1, and extends under the storage capacitance line C1. A source electrode of the switching element SW corresponds to that region of the source line S1, which is in contact with the semiconductor layer. A gate electrode of the switching element SW corresponds to that region of the gate line G1, which crosses the semiconductor layer. A drain electrode of the switching element SW is in contact with the semiconductor layer extending under the storage capacitance line C1.

The pixel electrode PE includes a first pixel electrode PE1 which is located in an underlayer, and a second pixel electrode PE2 which is located in a layer above the first pixel electrode PE1. In the meantime, in the example illustrated, only the pixel electrode PE disposed in one pixel PX is illustrated, but pixel electrodes of the same shape are also disposed in other pixels, the depiction of which is omitted. The first pixel electrode PE1 is electrically connected to the switching element SW. The second pixel electrode PE2 is electrically connected to the first pixel electrode PE1.

In the example illustrated, the first pixel electrode PE1 has a rectangular shape having a less length in the first direction X than in the second direction Y in the X-Y plane, like the shape of the pixel PX. The first pixel electrode PE1 includes a pair of edge portions PEE1 and PEE2 which are parallel to the second direction Y. The edge portion PEE1 is located near the source line S1 and linearly extends along the source line S1. The edge portion PEE2 is located near the source line S2 and linearly extends along the source line S2. The width in the first direction X of the first pixel electrode PE1 can be increased within such a range that the first pixel electrode PE1 does not come in contact with first pixel electrodes of pixels neighboring the pixel PX on the right side and left side. Specifically, the edge portions PEE1 and PEE2 are electrically insulated from the source line S1 and source line S2, respectively, and may extend to positions overlapping the source line S1 and source line S2. The width in the second direction Y of the first pixel electrode PE1 can be increased within such a range that the first pixel electrode PE1 does not come in contact with first pixel electrodes of pixels neighboring the pixel PX on the upper side and lower side. Specifically, those edge portions of the first pixel electrode PE1, which are parallel to the first direction X, are electrically insulated from the gate line G1 and gate line G2, respectively, and may extend to positions overlapping the gate line G1 and gate line G2. The first pixel electrode PE1 is formed of a transparent, electrically conductive material such as the above-described ITO. The first pixel electrode PE1 is electrically connected to the switching element SW at a position overlapping the storage capacitance line C1.

The second pixel electrode PE2 has a shape different from the shape of the first pixel electrode PE1, and includes a main pixel electrode PA and a sub-pixel electrode PB. The main pixel electrode PA and sub-pixel electrode PB are formed integral or continuous, and are electrically connected to each other. The second pixel electrode PE2 is formed of the above-described transparent, electrically conductive material, or opaque wiring material.

The main pixel electrode PA is located between the source line S1 and source line S2, and linearly extends in the second direction Y to the vicinity of the upper side end portion of the pixel PX and to the vicinity of the lower side end portion of the pixel PX. In the example illustrated, the main pixel electrode PA is located at a substantially middle point between the source line S1 and source line S2. Specifically, a distance in the first direction X between the source line S1 and main pixel electrode PA is substantially equal to a distance in the first direction X between the source line S2 and main pixel electrode PA. The main pixel electrode PA is formed in a strip shape having a substantially uniform width in the first direction X. In the X-Y plane, the main pixel electrode PA is located between the paired edge portions PEE1 and PEE2 of the first pixel electrode PE1. In addition, the edge portion PEE1 is located closer to the source line S1 than to the main pixel electrode PA, and the edge portion PEE2 is located closer to the source line S2 than to the main pixel electrode PA.

The sub-pixel electrode PB is located at a substantially central part of the pixel PX, and linearly extends in the first direction X. In the example illustrated, the sub-pixel electrode PB is located at a position overlapping the storage capacitance line C1, and crosses a substantially middle portion in the second direction Y of the main pixel electrode PA. Specifically, the second pixel electrode PE2 illustrated in FIG. 2, is formed in a cross shape. In the meantime, although the sub-pixel electrode PB is formed in a strip shape having a substantially uniform width in the second direction Y, the shape of the sub-pixel electrode PB is not limited to this example.

The first common electrode CE1 includes a first main common electrode CA1 and a first sub-common electrode CB1. The first main common electrode CA1 and first sub-common electrode CB1 are formed integral or continuous, and are electrically connected to each other. The first common electrode CE1 is spaced apart from the first pixel electrode PE1 and second pixel electrode PE2, and is formed of, for example, the above-described transparent, electrically conductive material. In addition, the first common electrode CE1 is connected to the power supply module VS on the outside of the active area ACT.

The first main common electrode CA1 extends along the source line S. Alternatively, the first main common electrode CA1, in the X-Y plane, is located on both sides of the main pixel electrode PA. The first main common electrode CA1 is formed in a strip shape having a substantially uniform width in the first direction X. The electrode width of the first main common electrode CA1 in the first direction X is greater than, for example, the line width of the source line S in the first direction X.

In the example illustrated, the first main common electrode CA1 includes two first main common electrodes arranged in parallel with a distance in the first direction X, namely a first main common electrode CAL1 and a first main common electrode CAR1. The first main common electrode CAL1 is disposed at the left side end portion of the pixel PX, and is disposed to extend over a boundary between the pixel PX and a pixel neighboring on the left side. The first main common electrode CAL1 is opposed to the source line S1. An electrode width W11 of the first main common electrode CAL1 is greater than a line width W12 of the source line S1. The first main common electrode CAL1 is disposed at a position overlapping the source line S1, and extends to the first pixel electrode side from the first pixel electrode PE1-side edge of the source line S1. The first main common electrode CAR1 is disposed at the right side end portion of the pixel PX, and is disposed to extend over a boundary between the pixel PX and a pixel neighboring on the right side. The first main common electrode CAR1 is opposed to the source line S2. An electrode width W21 of the first main common electrode CAR1 is greater than a line width W22 of the source line S2. The first main common electrode CAR1 is disposed at a position overlapping the source line S2, and extends to the first pixel electrode side from the first pixel electrode PE1-side edge of the source line S2.

The first sub-common electrode CB1 extends along the gate line G, or linearly extends in the first direction X in the X-Y plane. The first sub-common electrode CB1 is formed at a position opposed to the gate line G. The first sub-common electrode CB1 is formed in a strip shape. Incidentally, the width of the first sub-common electrode CB1 in the second direction Y may not necessarily be uniform. The electrode width of the first sub-common electrode CB1 in the second direction Y is greater than, for example, the line width of the gate line G in the second direction Y.

In the example illustrated, the first sub-common electrode CB1 includes two first sub-common electrodes arranged in parallel with a distance in the second direction Y, namely a first sub-common electrode CBU1 disposed and a first sub-common electrode CBB1. The first sub-common electrode CBU1 is located at the upper side end portion of the pixel PX, and is disposed to extend over a boundary between the pixel PX and a pixel neighboring on the upper side. The first sub-common electrode CBB1 is disposed at the lower side end portion of the pixel PX, and is disposed to extend over a boundary between the pixel PX and a pixel neighboring on the lower side. Specifically, in the example illustrated, the first common electrode CE1 is formed of the first main common electrode CA1 and first sub-common electrode CB1 in a grid shape which partitions the pixel PX, and surrounds the first pixel electrode PE1 and second pixel electrode PE2.

The first sub-common electrode CBU1 is opposed to the gate line G1. An electrode width W31 of the first sub-common electrode CBU1 is greater than a line width W32 of the gate line G1. The first sub-common electrode CBU1 is disposed at a position overlapping the gate line G1, and extends to the first pixel electrode side from the first pixel electrode PE1-side edge of the gate line G1. The first sub-common electrode CBB1 is opposed to the gate line G2. An electrode width W41 of the first sub-common electrode CBB1 is greater than a line width W42 of the gate line G2. The first sub-common electrode CBB1 is disposed at a position overlapping the gate line G2, and extends to the first pixel electrode side from the first pixel electrode PE1-side edge of the gate line G2.

In the meantime, the first common electrode CE1 may further include a second main common electrode CA2 which extends along the first main common electrode CA1, and has the same potential as the first main common electrode CA1. In addition, the first common electrode CE1 may further include a second sub-common electrode CB2 which extends along the first sub-common electrode CB1, and has the same potential as the first sub-common electrode CB1. A structure including the second main common electrode CA2 and second sub-common electrode CB2 will be described later.

Paying attention to the positional relationship between the main pixel electrode PA and the first main common electrode CA1, the main pixel electrode PA and first main common electrode CA1 are substantially parallel in the X-Y plane, and are alternately arranged in the first direction X. Specifically, one main pixel electrode PA is located between the first main common electrode CAL1 and first main common electrode CAR1 which neighbor with a distance in the first direction X (or between the neighboring source lines).

In addition, paying attention to the shapes of the first pixel electrode PE1 and second pixel electrode PE2, the first pixel electrode PE1 and second pixel electrode PE2 have different shapes. The edge portion PEE1, which is located on the left side in the Figure, extends to a position closer to the source line S1 and first main common electrode CAL1 than to the main pixel electrode PA of the second pixel electrode PE2. The edge portion PEE2, which is located on the right side in the Figure, extends to a position closer to the source line S2 and first main common electrode CAR1 than to the main pixel electrode PA.

In the array substrate AR, the second pixel electrode PE2 and first common electrode CE1 are covered with the first alignment film AL1. The first alignment film AL1 is subjected to alignment treatment (e.g. rubbing treatment or optical alignment treatment) in a first alignment treatment direction PD1 for initially aligning the liquid crystal molecules of the liquid crystal layer LQ. The first alignment treatment direction PD1, in which the first alignment film AL1 initially aligns the liquid crystal molecules, is substantially parallel to the second direction Y.

Figure 3:
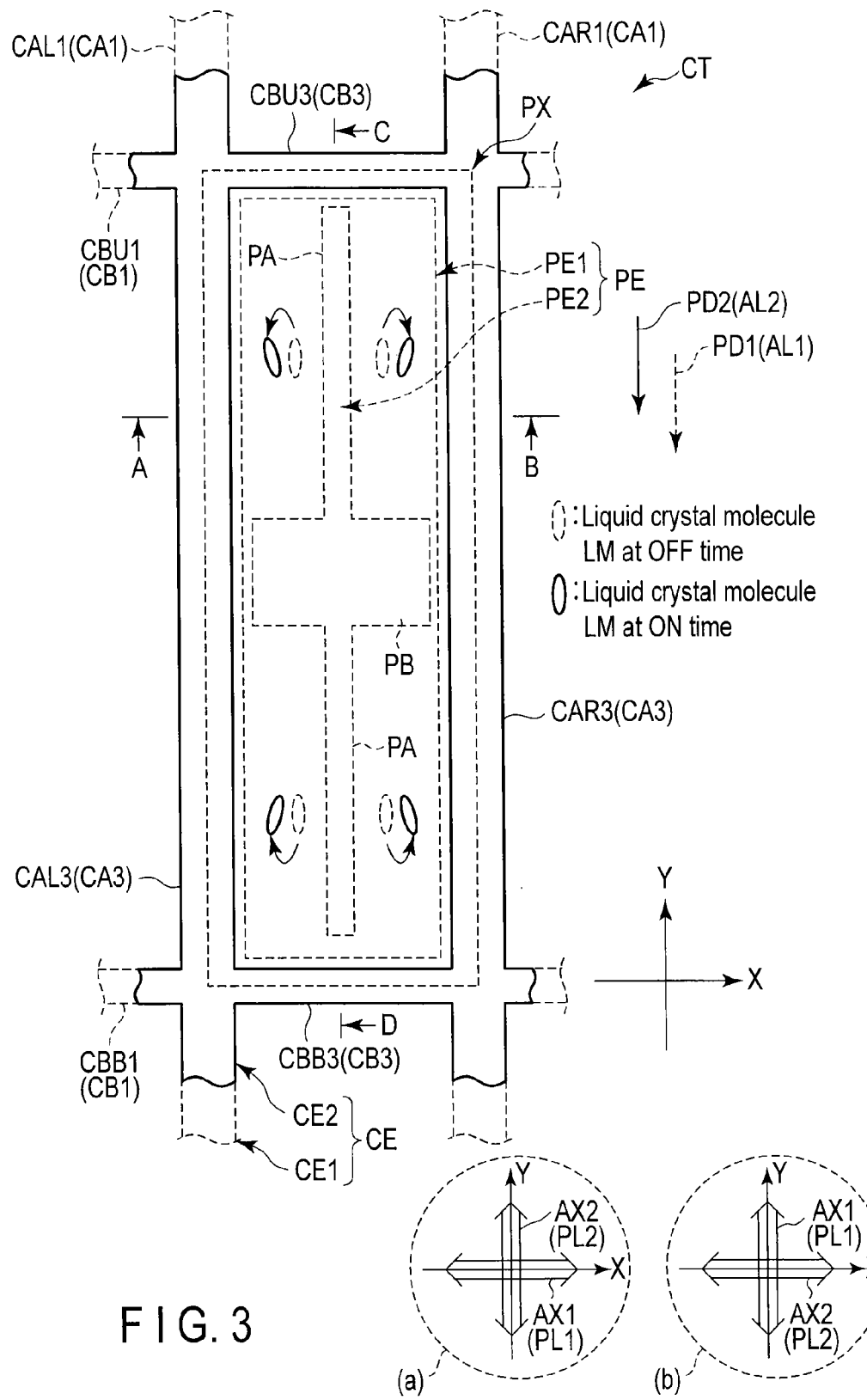
FIG. 3 is a plan view which schematically shows a structure example of one pixel in a counter-substrate shown in FIG. 1.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and the pixel electrode PE and first common electrode CE1, which are main parts of the array substrate, are indicated by broken lines.

The counter-substrate CT includes a second common electrode CE2 which is a part of the common electrode CE. The second common electrode CE2 includes a third main common electrode CA3 and a third sub-common electrode CB3. The third main common electrode CA3 and third sub-common electrode CB3 are formed integral or continuous, and are electrically connected to each other. In addition, the third main common electrode CA3 and third sub-common electrode CB3 are electrically connected to the first common electrode CE1 which is provided on the array substrate, for example, on the outside of the active area, and have the same potential as the first common electrode CE1.

The third main common electrode CA3, in the X-Y plane, is located on both sides of the main pixel electrode PA, and linearly extends in the second direction Y. The third main common electrode CA3 is located above the first main common electrode CA1. The third main common electrode CA3 is formed in a strip shape having a substantially uniform width in the first direction X. In the example illustrated, the third main common electrode CA3 includes two third main common electrodes arranged in parallel with a distance in the first direction X, namely a third main common electrode CAL3 disposed at the left side end portion of the pixel PX, and a third main common electrode CAR3 disposed at the right side end portion of the pixel PX. Strictly speaking, the third main common electrode CAL3 is disposed to extend over a boundary between the pixel PX and a pixel neighboring on the left side, and the third main common electrode CAR3 is disposed to extend over a boundary between the pixel PX and a pixel neighboring on the right side. The third main common electrode CAL3 is opposed to the first main common electrode CAL1. The third main common electrode CARS is opposed to the first main common electrode CAR1.

The third sub-common electrode CB3, in the X-Y plane, linearly extends in the first direction X. The third sub-common electrode CB3 is located above the first sub-common electrode CB1. The third sub-common electrode CB3 is formed in a strip shape having a substantially uniform width in the second direction Y.

In the example illustrated, the third sub-common electrode CB3 includes two third sub-common electrodes arranged in parallel with a distance in the second direction Y, namely a third sub-common electrode CBU3 disposed at the upper side end portion of the pixel PX, and a third sub-common electrode CBB3 disposed at the lower side end portion of the pixel PX. Strictly speaking, the third sub-common electrode CBU3 is disposed to extend over a boundary between the pixel PX and a pixel neighboring on the upper side, and the third sub-common electrode CBB3 is disposed to extend over a boundary between the pixel PX and a pixel neighboring on the lower side. The third sub-common electrode CBU3 is opposed to the first sub-common electrode CBU1, and the third sub-common electrode CBB3 is opposed to the first sub-common electrode CBB1. Specifically, in the counter-substrate CT, the second common electrode CE2 is formed of the third main common electrode CA3 and third sub-common electrode CB3 in a grid shape which partitions the pixel PX.

In the counter-substrate CT, the second common electrode CE2 is covered with the second alignment film AL2. The second alignment film AL2 is subjected to alignment treatment (e.g. rubbing treatment or optical alignment treatment) in a second alignment treatment direction PD2 for initially aligning the liquid crystal molecules of the liquid crystal layer LQ. The second alignment treatment direction PD2, in which the second alignment film AL2 initially aligns the liquid crystal molecules, is substantially parallel to the first alignment treatment direction PD1. In the example illustrated, the second alignment treatment direction PD2 and the first alignment treatment direction PD1 are identical. In the meantime, the first alignment treatment direction PD1 and the second alignment treatment direction PD2 may be opposite to each other, or may be identical in a direction reverse to the direction in the illustrated example, that is, in a direction from the gate line G2 toward the gate line G1.

Figure 4:
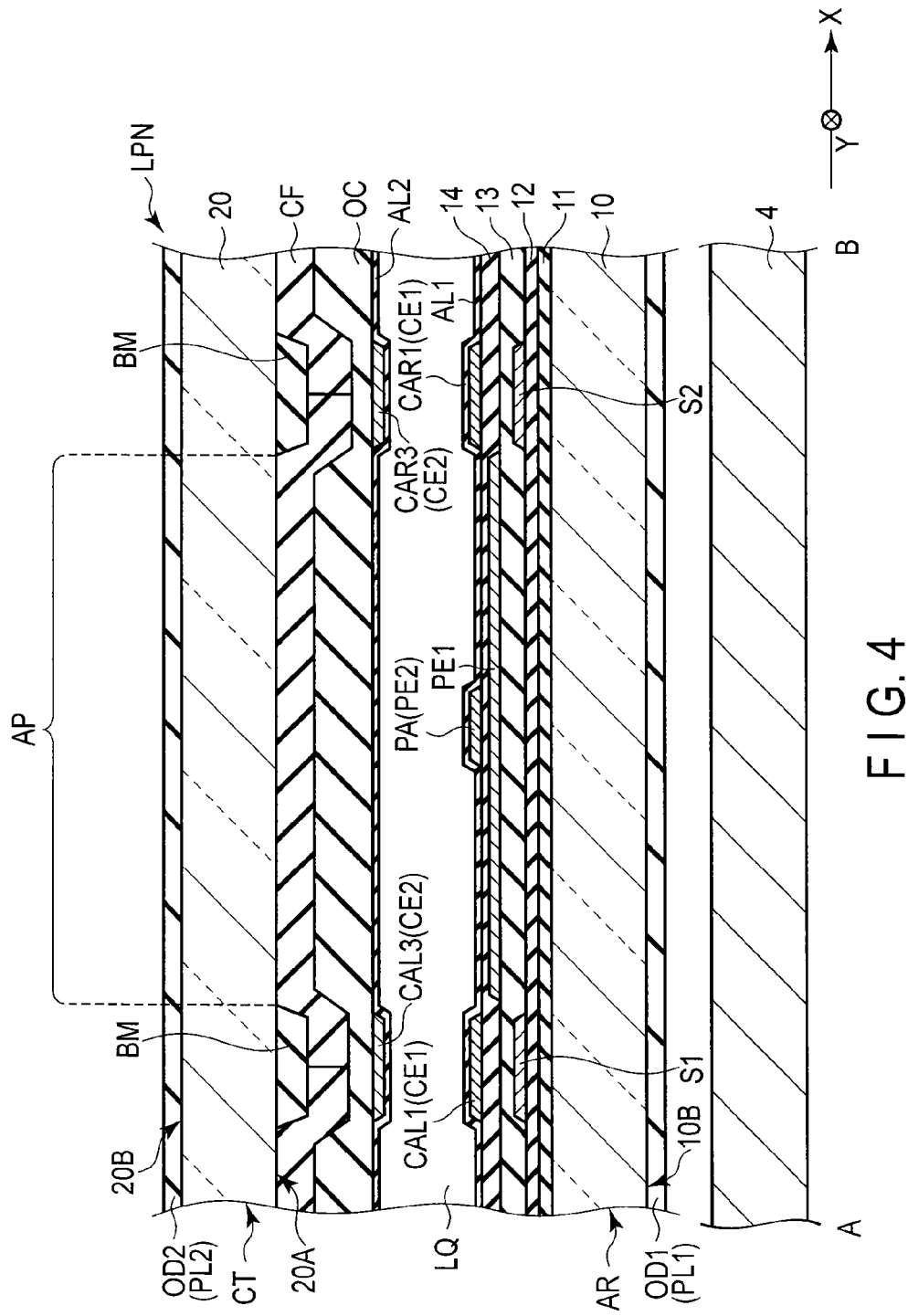
FIG. 4 is a schematic cross-sectional view, taken along line A-B in FIG. 3, showing a cross-sectional structure of a liquid crystal display panel shown in FIG. 3.
Figure 5:
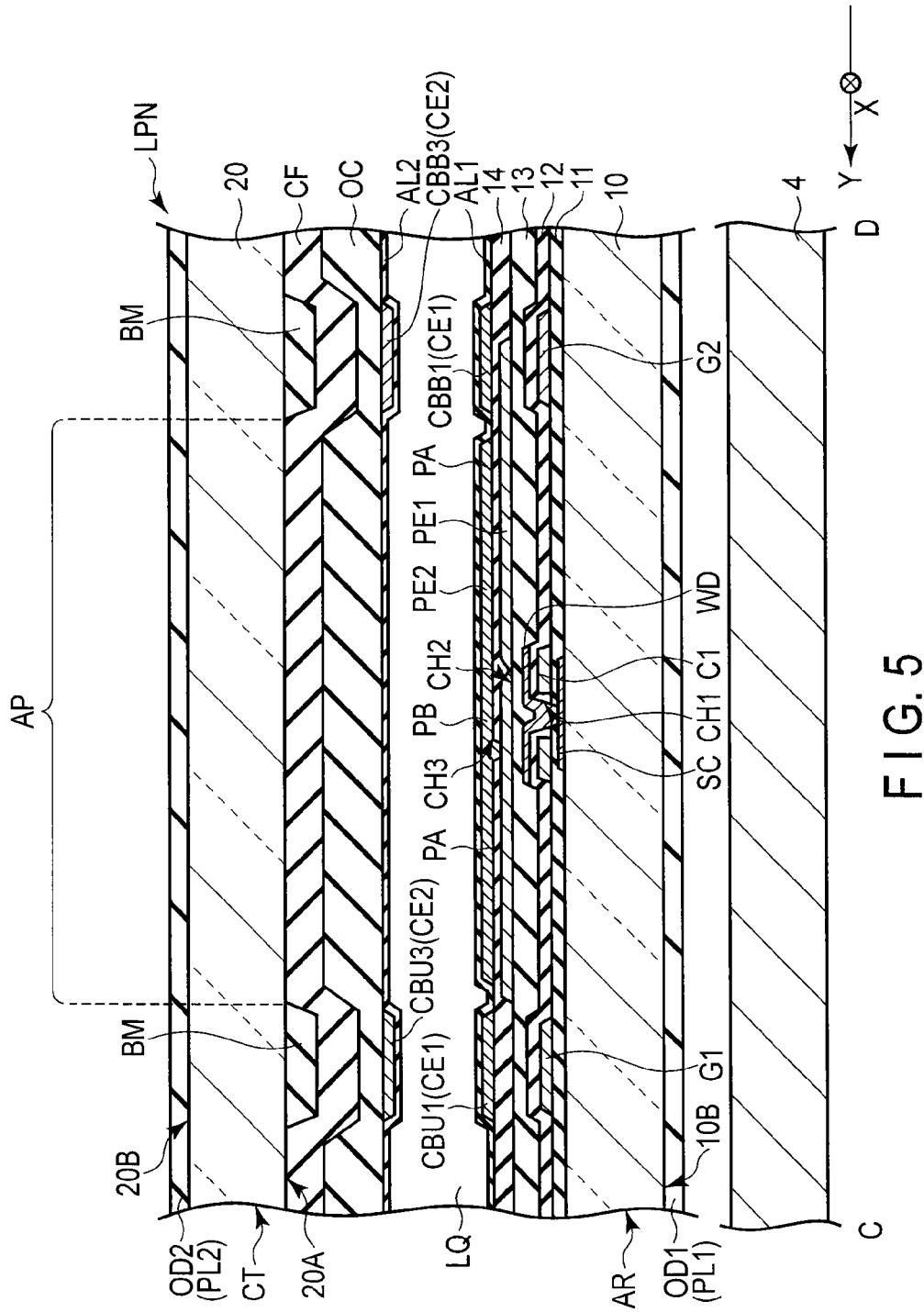
FIG. 5 is a schematic cross-sectional view, taken along line C-D in FIG. 3, showing a cross-sectional structure of the liquid crystal display panel shown in FIG. 3.

FIG. 4 is a schematic cross-sectional view, taken along line A-B in FIG. 3, showing a cross-sectional structure of the liquid crystal display panel LPN shown in FIG. 3, as viewed from the gate line G2 side. FIG. 5 is a schematic cross-sectional view, taken along line C-D in FIG. 3, showing a cross-sectional structure of the liquid crystal display panel LPN shown in FIG. 3, as viewed from the source line S1 side. FIG. 4 and FIG. 5 show only parts which are necessary for the description.

A backlight 4 is disposed on the back side of the array substrate AR which constitutes the liquid crystal display panel LPN. Various modes are applicable to the backlight 4. A description of the detailed structure of the backlight 4 is omitted.

The array substrate AR is formed by using a first insulative substrate 10 having light transmissivity. The array substrate AR includes, on the inside of the first insulative substrate 10, that is, on the side facing the counter-substrate CT, a semiconductor layer SC of a switching element which is not described in detail, a gate line G1, a gate line G2, a storage capacitance line C1, a source line S1, a source line S2, a first pixel electrode PE1, a second pixel electrode PE2, a first common electrode CE1, a first insulation film 11, a second insulation film 12, a third insulation film 13, a fourth insulation film 14, and a first alignment film AL1.

The semiconductor layer SC is formed between the first insulative substrate 10 and first insulation film 11. The storage capacitance line C1, gate line G1 and gate line G2 are formed on the first insulation film 11, and are covered with the second insulation film 12. A drain electrode WD of the switching element, the source line S1 and the source line S2 are formed on the second insulation film 12 and are covered with the third insulation film 13. The drain electrode WD extends in a contact hole CH1 which penetrates the first insulation film 11 and second insulation film 12, and is put in contact with the semiconductor layer SC which is exposed from the contact hole CH1. The drain electrode WD is an electrode layer which is formed in the same layer as the source line S1, etc., and can be formed batchwise together with the source line S1, etc. of the same material.

The first pixel electrode PE1 is formed on the third insulation film 13, and is covered with the fourth insulation film 14. The first pixel electrode PE1 extends in a contact hole CH2 which penetrates the third insulation film 13, and is put in contact with the drain electrode WD which is exposed from the contact hole CH2. The fourth insulation film 14 is formed of, for example, a transparent resin material. The fourth insulation film 14 reduces stepped portions due to the source lines S and first pixel electrode PE1, and the surface of the fourth insulation film 14 is planarized.

The main pixel electrode PA and sub-pixel electrode PB of the second pixel electrode PE2, and the first main common electrode CAL1, first main common electrode CAR1, first sub-common electrode CBU1 and first sub-common electrode CBB1 of the first common electrode CE1, are formed on the fourth insulation film 14. Specifically, the second pixel electrode PE2 and first common electrode CE1 are formed in the same layer, and can be formed batchwise of the same material, for instance, ITO. The second pixel electrode PE2 is spaced apart from the first common electrode CE1. The main common electrode PA is located between the neighboring first main common electrode CAL1 and first main common electrode CAR1. The sub-pixel electrode PB is located between the neighboring first sub-common electrode CBU1 and first sub-common electrode CBB1. The second pixel electrode PE2 extends in a contact hole CH3 which penetrates the fourth insulation film 14, and is put in contact with the first pixel electrode PE1 which is exposed from the contact hole CH3. The first main common electrode CAL1 is located above the source line S1. The first main common electrode CAR1 is located above the source line S2. The first sub-common electrode CBU1 is located above the gate line G1. The first sub-common electrode CBB1 is located above the gate line G2.

The first alignment film AL1 is disposed on that surface of the array substrate AR, which is opposed to the counter-substrate CT, and the first alignment film AL1 extends over substantially the entirety of the active area ACT. The first alignment film AL1 covers the second pixel electrode PE2 and the first common electrode CE1, and is also disposed on the fourth insulation film 14. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, second common electrode CE2 and second alignment film AL2, on the inside of the second insulative substrate 20, that is, on that side of the second insulative substrate 20, which is opposed to the array substrate AR.

The black matrix BM partitions each pixel PX and forms an aperture portion AP which is opposed to the second pixel electrode PE2. Specifically, the black matrix BM is disposed so as to be opposed to wiring portions, such as the source lines S, gate lines G and switching elements SW. In the example illustrated, the black matrix BM includes portions which are located above the source line S1 and source line S2 and extend in the second direction Y, and portions which are located above the gate line G1 and gate line G2 and extend in the first direction X, and the black matrix BM is formed in a grid shape. The black matrix BM is disposed on an inner surface 20A of the second insulative substrate 20, which is opposed to the array substrate AR.

The color filter CF is disposed in association with each pixel PX. Specifically, the color filter CF is disposed on an inside (aperture portion AP) partitioned by the black matrix BM on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF. The overcoat layer OC is formed of, for example, a transparent resin material.

The third main common electrode CAL3, third main common electrode CAR3, third sub-common electrode CBU3 and third sub-common electrode CBB3 of the second common electrode CE2 are formed on that side of the overcoat layer OC, which is opposed to the array substrate AR, and are located below the black matrix BM. The first main common electrode CAL1 is located below the third main common electrode CAL3. The first main common electrode CAR1 is located below the third main common electrode CAR3. The first sub-common electrode CBU1 is located below the third sub-common electrode CBU3. The first sub-common electrode CBB1 is located below the third sub-common electrode CBB3. In the aperture portion AP, regions between the second pixel electrode PE2 and the first common electrode CE1 and second common electrode CE2 correspond to transmissive regions through which backlight can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the second common electrode CE2 and the overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are attached by a sealant on the outside of the active area ACT in the state in which the predetermined cell gap is created therebetween. The cell gap is smaller than the distance between the main pixel electrode PA and the first main common electrode CA1. The liquid crystal layer LQ is held in the cell gap which is created between the array substrate AR and the counter-substrate CT, and is disposed between the first alignment film AL1 and second alignment film AL2. The liquid crystal layer LQ is composed of a liquid crystal material including liquid crystal molecules LM and having, for example, a positive (positive-type) dielectric constant anisotropy.

A first optical element OD1 is attached to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed, for example, such that the polarization axis thereof is substantially parallel or substantially perpendicular to the direction of extension of the main pixel electrode PA or the initial alignment direction of liquid crystal molecules. In an example shown in part (a) of FIG. 3, the first polarizer PL1 is disposed such that the first polarization axis AX1 thereof is parallel to the first direction X, and the second polarizer PL2 is disposed such that the second polarization axis AX2 thereof is parallel to the second direction Y. In an example shown in part (b) of FIG. 3, the second polarizer PL2 is disposed such that the second polarization axis AX2 thereof is parallel to the first direction X, and the first polarizer PL1 is disposed such that the first polarization axis AX1 thereof is parallel to the second direction Y.

Next, the operation of the liquid crystal display panel LPN having the above-described structure is described.

Specifically, in a state in which no voltage is applied to the liquid crystal layer LQ, that is, in a state (OFF time) in which no electric field is produced between the pixel electrode PE (first pixel electrode PE1 and second pixel electrode PE2) and common electrode CE (first common electrode CE1 and second common electrode CE2), the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

In the meantime, the initial alignment direction of the liquid crystal molecule LM corresponds to a direction in which the major axis of the liquid crystal molecule LM at the OFF time is orthogonally projected onto the X-Y plane. In this example, the first alignment treatment direction PD1 and the second alignment treatment direction PD2 are substantially parallel to the second direction Y and are identical. The liquid crystal molecule LM at the OFF time is initially aligned such that the major axis thereof is substantially parallel to the second direction Y, as indicated by a broken line in FIG. 3. In short, the initial alignment direction of the liquid crystal molecule LM is parallel to the second direction Y.

In the cross section of the liquid crystal layer LQ, the liquid crystal molecules LM are substantially horizontally aligned (the pre-tilt angle is substantially zero) in the middle part of the liquid crystal layer LQ, and the liquid crystal molecules LM are aligned with such pre-tilt angles that the liquid crystal molecules LM become symmetric in the vicinity of the array substrate AR (i.e. in the vicinity of first alignment film AL1) and in the vicinity of the counter-substrate CT (i.e. in the vicinity of second alignment film AL2), with respect to the middle part as the boundary (splay alignment). In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

At this OFF time, part of light from the backlight 4 passes through the first polarizer PL1, and enters the liquid crystal display panel LPN. The light, which has entered the liquid crystal display panel LPN, is linearly polarized light which is perpendicular to the first polarization axis AX1 of the first polarizer PL1. The polarization state of linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and the common electrode CE, a lateral electric field (or an oblique electric field), which is substantially parallel to the substrates, is produced between the pixel electrode PE and the common electrode CE. The liquid crystal molecules LM are affected by the electric field between the pixel electrode PE and common electrode CE, and the alignment state thereof varies. In the example shown in FIG. 3, in the region between the pixel electrode PE and third main common electrode CAL3, the liquid crystal molecule LM in a lower-half region rotates clockwise relative to the second direction Y, and is aligned in a lower left direction in the Figure, and the liquid crystal molecule LM in an upper-half region rotates counterclockwise relative to the second direction Y, and is aligned in an upper left direction in the Figure. In the region between the pixel electrode PE and third main common electrode CARS, the liquid crystal molecule LM in a lower-half region rotates counterclockwise relative to the second direction Y, and is aligned in a lower right direction in the Figure, and the liquid crystal molecule LM in an upper-half region rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the second pixel electrodes PE2, and domains are formed in the respective alignment directions. Specifically, a plurality of domains are formed in one pixel PX.

Thereby, in the pixel PX, a transmissive region, through which backlight can pass, is formed between the second pixel electrode PE2 and common electrode CE. In this case, at positions overlapping the second pixel electrode PE2, first common electrode CE1 and second common electrode CE2, since the liquid crystal molecules are kept in the initial alignment state, black display is effected as in the case of the OFF time. On the other hand, the first pixel electrode PE1 is formed of a transparent, electrically conductive material and, at a position overlapping the first pixel electrode PE1, the alignment state of liquid crystal molecules varies by being affected by the electric field between the second pixel electrode PE2 and the first common electrode CE1 and second common electrode CE2. Thus, backlight can pass through the region of the first pixel electrode PE1. At this ON time, the polarization state of linearly polarized light, which has entered the liquid crystal display panel LPN, varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display).

According to the present embodiment, the influence of a leak electric field from the source line S which neighbors the pixel electrode PE can be relaxed, and degradation in display quality due to crosstalk can be suppressed. This point will now be described.

Specifically, an examination is made of a comparative example in which each pixel in a pixel column between the source line S1 and source line S2 does not include the first pixel electrode. When the polarity of a video signal, which is written from the source line S1, is different from the polarity of a video signal, which is written from the source line S2, a large potential difference is created between the second pixel electrode PE2, which is connected to the source line S1, and the source line S2, and there is concern that a variation of pixel transmittance due to the effect of a leak electric field from the source line S2 becomes non-negligible. For example, in the case where a video signal of +5 V is supplied to the source line S1 and a video signal of −5 V is supplied to the source line S2 at a certain timing in one frame period, relative to the common potential (0 V) of the common electrode CE, a large potential difference hardly occurs between the second pixel electrode PE2 and the source line S1 since the potential of the second pixel electrode PE2 and the potential of the source line S1 are equal (each of these potentials is +5 V) or these potentials are of the same polarity (in the frame period in which the second pixel electrode PE2 is kept at a positive potential, the video signal that is supplied to the source line S1 is of the positive polarity). On the other hand, since the polarity of potential of the second pixel electrode PE2 is different from the polarity of potential of the source line S2 (for example, while the potential of the second pixel electrode PE2 is kept at +5 V, the potential of the source line S2 is −5 V), a large potential difference is produced between the second pixel electrode PE2 and source line S2. Thus, since a desired electric field is produced in the region between the second pixel electrode PE2 and source line S1 and liquid crystal molecules are aligned in a desired direction, a necessary transmittance is obtained in this region. On the other hand, an excessive electric field is produced in the region between the second pixel electrode PE2 and source line S2, liquid crystal molecules are not aligned in a desired direction in this region, and there is a case in which a necessary transmittance cannot be obtained in this region. In the case where an intermediate gray level (gray) is displayed in each pixel, while a transmittance corresponding to gray display is obtained in the region between the second pixel electrode PE2 and source line S1, a high transmittance close to white display is obtained in the region between the second pixel electrode PE2 and source line S2. Thus, a desired transmittance is not obtained in units of a pixel.

In addition, in the structure of the comparative example, when use is made of such a driving method that the polarity of a video signal supplied to each source line S is reversed on a frame-by-frame basis, there is higher susceptibility to the influence of a leak electric field from the source lines S.

According to the first structure example of the present embodiment, in the pixel column between the source line S1 and source line S2, each pixel includes, in addition to the second pixel electrode PE2, the first pixel electrode PE1 in the layer under the second pixel electrode PE2 (on the side closer to the source line than to the second pixel electrode PE2). In addition, the first pixel electrode PE1 includes the edge portions PEE1 and PEE2 which are located closer to the source line S and first main common electrode CA1 than to the main pixel electrode PA of the second pixel electrode PE2.

Thus, at the ON time, an electric field, which is necessary for controlling the alignment of liquid crystal molecules, is produced between the second pixel electrode PE2 and the first common electrode CE1 and second common electrode CE2, and a shield electric field (or a fringe electric field) is also produced between the first pixel electrode PE1 and the first common electrode CE1. This shield electric field shields an undesired leak electric field from the source line S due to a potential difference between the source line S and the second pixel electrode PE2. For example, even in the case where the polarity of potential of the second pixel electrode PE2 and the polarity of potential of the source line S2 are different, as in the case of the above-described comparative example, the shield electric field between the first pixel electrode PE1 and first main common electrode CAR1 can suppress production of an undesired electric field between the source line S2 and the second pixel electrode PE2. In addition, even when use is made of such a driving method that the polarity of a video signal supplied to each source line S is reversed on a frame-by-frame basis, the shield electric field between the first pixel electrode PE1 and first main common electrode CAL1 can suppress production of an undesired electric field between the source line S1 and the second pixel electrode PE2. Therefore, the influence of an undesired electric field in that area of the transmissive region, which is close to the source line S, can be relaxed, and degradation in display quality can be suppressed.

Furthermore, according to the first structure example, since the first pixel electrode PE1 extends to the vicinity of the gate line G1 and to the vicinity of the gate line G2, a shield electric field can also be produced between the first pixel electrode PE1 and first sub-common electrode CB1 at the ON time. Therefore, the shield electric field, which is produced between the first pixel electrode PE1 and the first common electrode CE1, can shield an undesired leak electric field not only from the source line S but also from the gate line G.

In the meantime, in the above-described first structure example, in order to shield a leak electric field from the source line S and gate line G, a shield electric field between the first pixel electrode PE1 and the first common electrode CE1 is produced. However, if such a shield electric field acts on liquid crystal molecules, there may occur a case in which a desired transmittance cannot be obtained. Thus, by increasing the thickness of the fourth insulation film 14 that is formed of a transparent resin material, the influence of the shield electric field on the liquid crystal layer can be reduced. Since it is desirable that the fourth insulation film 14 be formed with a thickness of, e.g. about 1 μm, a higher yield can be obtained when the fourth insulation film 14 is formed of a resin material, than when the fourth insulation film 14 is formed of a transparent inorganic material.

Figure 6:
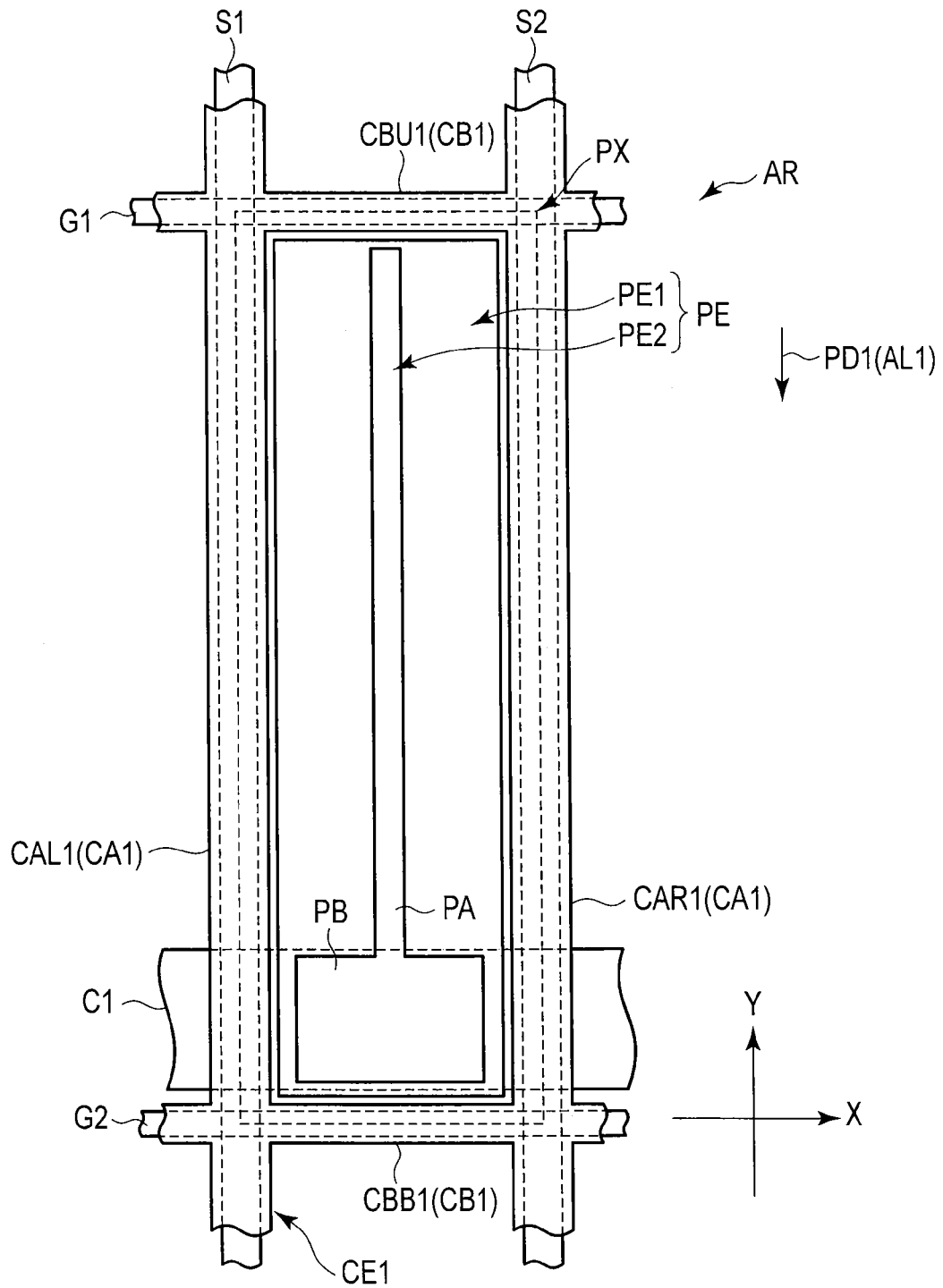
FIG. 6 is a plan view which schematically illustrates another structure example of the pixel at a time when the array substrate shown in FIG. 1 is viewed from the counter-substrate side.

FIG. 6 is a plan view which schematically illustrates another structure example of the pixel PX at a time when the array substrate AR shown in FIG. 1 is viewed from the counter-substrate side.

The example shown in FIG. 6 differs from the example shown in FIG. 2 in that the storage capacitance line C1 is eccentrically disposed closer to the gate line G2 than to the gate line G1, and that the second pixel electrode PE2 is formed in a T shape. Specifically, the distance between the storage capacitance line C1 and gate line G2 in the second direction Y is less than the distance between the storage capacitance line C1 and gate line G1 in the second direction Y. The sub-pixel electrode PB of the second pixel electrode PE2 is disposed at a position overlapping the storage capacitance line C1, and is continuous with one end portion of the main pixel electrode PA on the gate line G2 side in the second direction Y.

With this structure example, the same advantageous effect as in the above-described example can be obtained.

Figure 7:
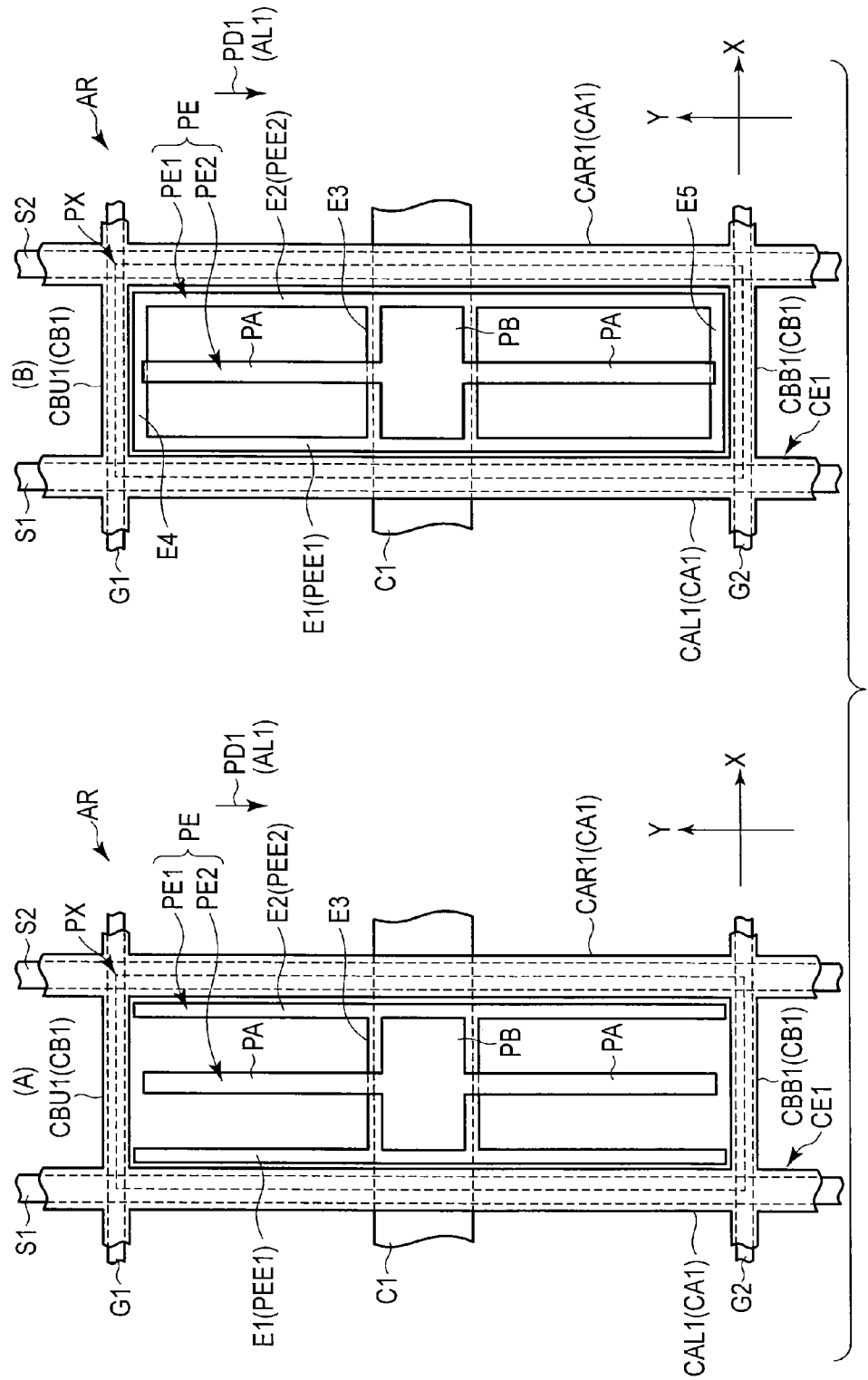
FIG. 7 is a plan view which schematically illustrates other structure examples of the pixel at a time when the array substrate shown in FIG. 1 is viewed from the counter-substrate side.

FIG. 7 is a plan view which schematically illustrates other structure examples of the pixel PX at a time when the array substrate AR shown in FIG. 1 is viewed from the counter-substrate side.

An example shown in part (A) of FIG. 7 differs from the example shown in FIG. 2 in that the first pixel electrode PE1 is formed in an H shape. Specifically, the first pixel electrode PE1 includes a first segment E1 and a second segment E2, which extend in the second direction Y, and a third segment E3 which extends in the first direction X. The first segment E1 corresponds to an edge portion which is located closer to the source line S1 and first main common electrode CAL1 than to the main pixel electrode PA. The second segment E2 corresponds to an edge portion which is located closer to the source line S2 and first main common electrode CAL1 than to the main pixel electrode PA. The third segment E3 is formed in a manner to connect the first segment E1 and second segment E2 at a position overlapping the storage capacitance line C1.

An example shown in part (B) of FIG. 7 differs from the example shown in part (A) in that the first pixel electrode PE1 is formed in a grid shape, or an "8"-like shape. Specifically, the first pixel electrode PE1 includes a first segment E1 and a second segment E2, which extend in the second direction Y, and a third segment E3, a fourth segment E4 and a fifth segment E5, which extend in the first direction X. The fourth segment E4 is located closer to the gate line G1 and first sub-common electrode CBU1 than to the sub-pixel electrode PB, and is continuous with the first segment E1 and second segment E2. The fifth segment E5 is located closer to the gate line G2 and first sub-common electrode CBB1 than to the sub-pixel electrode PB, and is continuous with the first segment E1 and second segment E2.

With this structure example, the same advantageous effect as in the above-described example can be obtained.

In the meantime, although the first segment E1 to fifth segment E5 are formed with substantially uniform widths, these widths are not limited to this example. In addition, as regards the shape of the second pixel electrode PE2 which is combined with the first pixel electrode PE1 having the shape shown in FIG. 7, this shape may be a T shape as shown in FIG. 6, as well as the cross shape shown in FIG. 7.

Next, a second structure example of the present embodiment is described.

Figure 8:
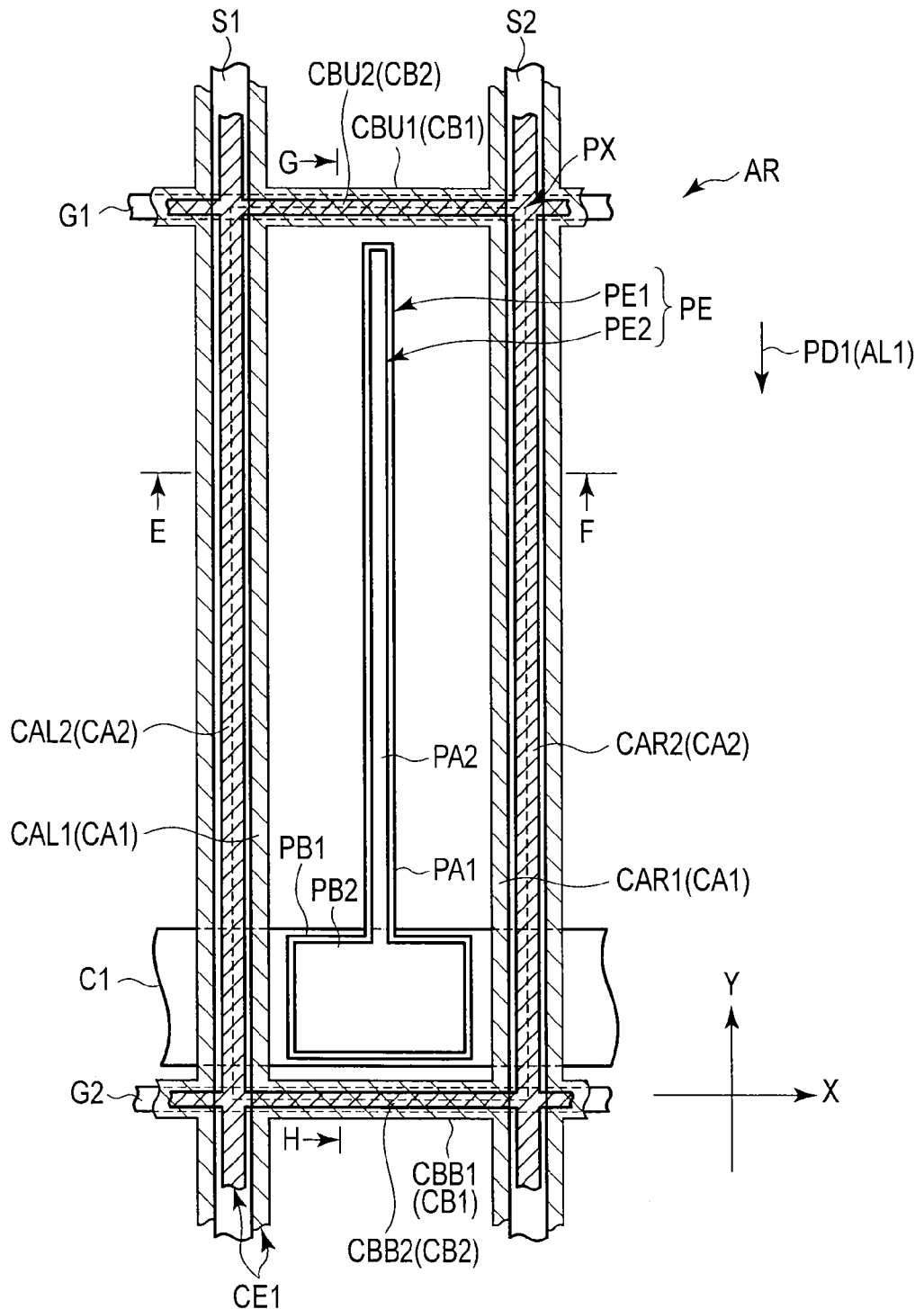
FIG. 8 is a plan view which schematically illustrates a second structure example of the pixel at a time when the array substrate shown in FIG. 1 is viewed from the counter-substrate side.

FIG. 8 is a plan view which schematically illustrates a second structure example of the pixel PX at a time when the array substrate AR shown in FIG. 1 is viewed from the counter-substrate side.

The second structure example differs from the above-described first structure example in that the first common electrode CE1, which is provided on the array substrate AR, includes a second main common electrode CA2 and a second sub-common electrode CB2, in addition to the first main common electrode CA1 and first sub-common electrode CB1. In addition, the second structure example differs from the first structure example in that the second pixel electrode PE2 is formed in substantially the same shape as the first pixel electrode PE1, and that the second pixel electrode PE2 is disposed at a position substantially overlapping the first pixel electrode PE1.

To begin with, the pixel electrode PE is described. In the example illustrated, the first pixel electrode PE1 and second pixel electrode PE2 are each formed in a T shape with substantially the same size. The first pixel electrode PE1 includes a first main pixel electrode PA1 having a strip shape extending in the second direction Y and a first sub-pixel electrode PB1 having a strip shape extending in the first direction X. The first sub-pixel electrode PB1 is disposed at a position overlapping the storage capacitance line C1, and is continuous with one end portion of the first main pixel electrode PA1 on the gate line G2 side in the second direction Y. The second pixel electrode PE2 includes a second main pixel electrode PA2 having a strip shape extending in the second direction Y and a second sub-pixel electrode PB2 having a strip shape extending in the first direction X. The second main pixel electrode PA2 is disposed at a position overlapping the first main pixel electrode PA1. The second sub-pixel electrode PB2 is disposed at a position overlapping the first sub-pixel electrode PB1, and is continuous with one end portion of the second main pixel electrode PA2. The first pixel electrode PE1 and second pixel electrode PE2 are formed of a transparent, electrically conductive material such as ITO, are electrically connected to each other, and have the same potential. In the meantime, the shape of each of the first pixel electrode PE1 and second pixel electrode PE2 may be the same cross shape as in the example shown in FIG. 2.

Next, the first common electrode CE1 is described. The first main common electrode CA1 extends along the source line S. The first main common electrode CA1 is located on the pixel electrode PE side of a position overlapping the source line S. In the example illustrated, a first main common electrode CAL1 extends along the source line S1, and is disposed on the pixel electrode PE side of a position overlapping the source line S1. A part of the first main common electrode CAL1 may extend to the position overlapping the source line S1. Similarly, a first main common electrode CAR1 extends along the source line S2, and is disposed on the pixel electrode PE side of a position overlapping the source line S2. A part of the first main common electrode CAR1 may extend to the position overlapping the source line S2.

The second main common electrode CA2 extends along the first main common electrode CA1. The second main common electrode CA2 has an electrode width which is smaller than the line width of the source line S, and is disposed at a position overlapping the source line S. In the example illustrated, a second main common electrode CAL2 extends along the first main common electrode CAL1, has an electrode width which is smaller than the line width of the source line S1, and is disposed at a position overlapping the source line S1. A second main common electrode CAR2 extends along the first main common electrode CAR1, has an electrode width which is smaller than the line width of the source line S2, and is disposed at a position overlapping the source line S2.

The first sub-common electrode CB1 extends along the gate line G. The first sub-common electrode CB1 has an electrode width which is greater than the line width of the gate line G, and is disposed at a position overlapping the gate line G. The first sub-common electrode CB1 is continuous with the first main common electrode CA1. In the example illustrated, a first sub-common electrode CBU1 is disposed at a position overlapping the gate line G1, and a first sub-common electrode CBB1 is disposed at a position overlapping the gate line G2.

The second sub-common electrode CB2 extends along the first sub-common electrode CB1. The second sub-common electrode CB2 has an electrode width which is smaller than the line width of the gate line G, and is disposed at a position overlapping the gate line G. The second sub-common electrode CB2 is continuous with the second main common electrode CA2. The second main common electrode CA2 and second sub-common electrode CB2 are electrically connected to each other and are formed in a grid shape. In the example illustrated, a second sub-common electrode CBU2 extends along the first sub-common electrode CBU1, has an electrode width which is smaller than the line width of the gate line G1, and is opposed to the first sub-common electrode CBU1 at a position overlapping the gate line G1. A second sub-common electrode CBB2 extends along the first sub-common electrode CBB1, has an electrode width which is smaller than the line width of the gate line G2, and is opposed to the first sub-common electrode CBB1 at a position overlapping the gate line G2.

The first main common electrode CA1, second main common electrode CA2, first sub-common electrode CB1 and second sub-common electrode CB2 are formed of a transparent, electrically conductive material such as ITO, are electrically connected to each other, for example, on the outside of the active area, and have the same potential.

The array substrate AR, which has been described in this second structure example, can be combined with the counter-substrate CT with the structure shown in FIG. 3.

Figure 9:
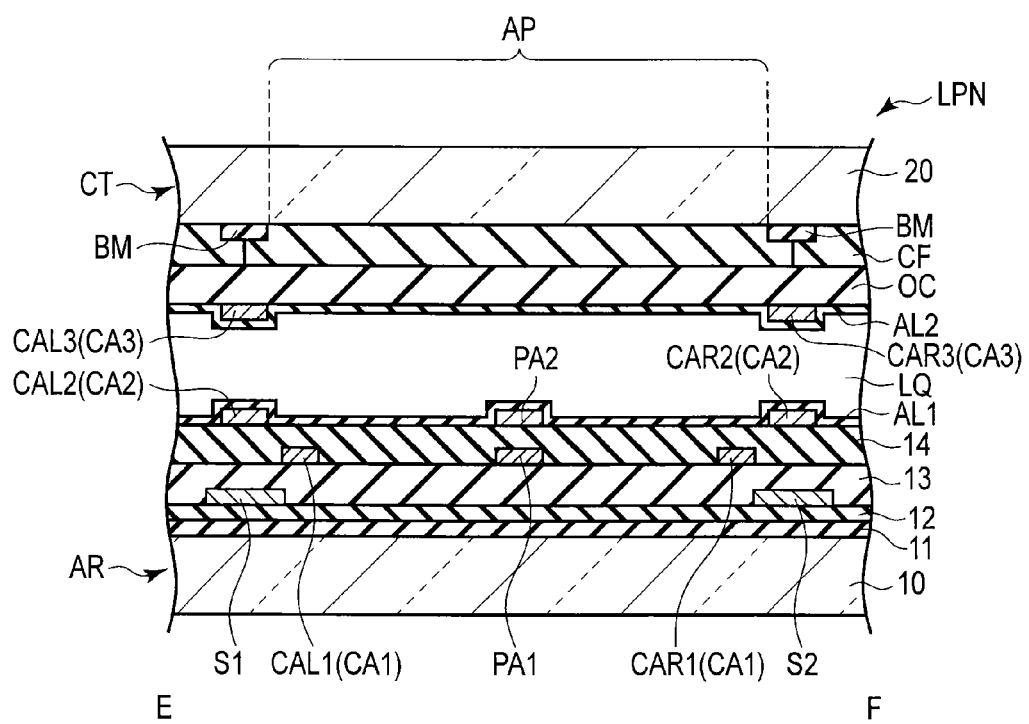
FIG. 9 is a cross-sectional view, taken along line E-F in FIG. 8, which shows, in a simplified fashion, a main part of a cross-sectional structure of a liquid crystal display panel shown in FIG. 8.
Figure 10:
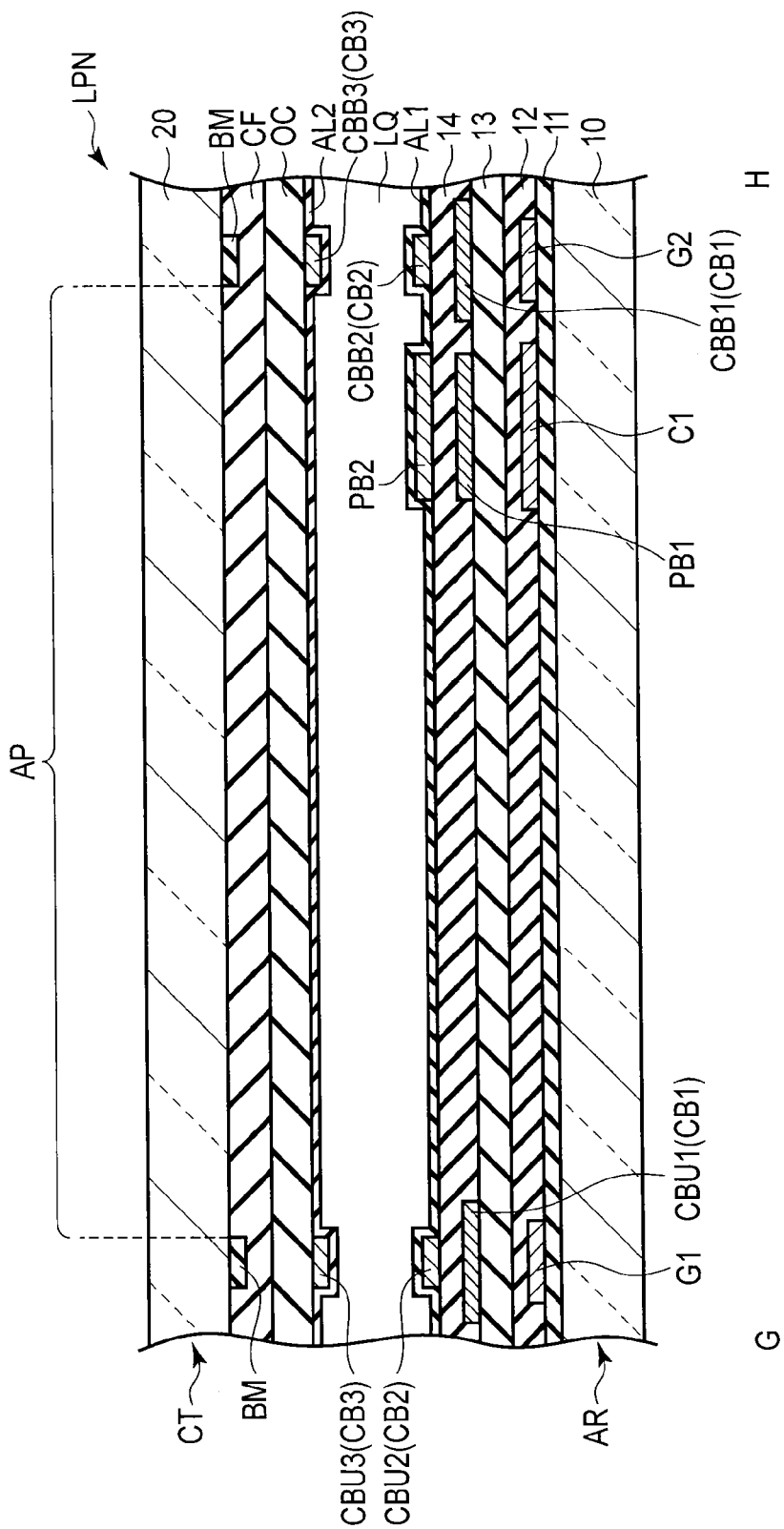
FIG. 10 is a cross-sectional view, taken along line G-H in FIG. 8, which shows, in a simplified fashion, a main part of a cross-sectional structure of the liquid crystal display panel shown in FIG. 8.

FIG. 9 is a cross-sectional view, taken along line E-F in FIG. 8, which shows, in a simplified fashion, a main part of a cross-sectional structure of a liquid crystal display panel LPN shown in FIG. 8. FIG. 10 is a cross-sectional view, taken along line G-H in FIG. 8, which shows, in a simplified fashion, a main part of a cross-sectional structure of the liquid crystal display panel LPN shown in FIG. 8. FIG. 9 and FIG. 10 show only parts which are necessary for the description.

The first main pixel electrode PA1 and first sub-pixel electrode PB1 of the first pixel electrode PE1, and the first main common electrode CA1 and first sub-common electrode CB1 of the first common electrode CE1, are formed on the third insulation film 13 by using, for example, the same transparent, electrically conductive material, and are covered with the fourth insulation film 14. The first main pixel electrode PA1 is located at a substantially middle point between the first main common electrode CAL1 and first main common electrode CAR1. The first sub-pixel electrode PB1 is located above the storage capacitance line C1 and is located closer to the first sub-common electrode CBB1 than to the first sub-common electrode CBU1. The first main common electrode CAL1 is located on the first main pixel electrode PA1 side of a position immediately above the source line S1. The first main common electrode CAR1 is located on the first main pixel electrode PA1 side of a position immediately above the source line S2. The first sub-common electrode CBU1 is disposed immediately above the gate line G1, and the first sub-common electrode CBB1 is disposed immediately above the gate line G2.

The second main pixel electrode PA2 and second sub-pixel electrode PB2 of the second pixel electrode PE2, and the second main common electrode CA2 and second sub-common electrode CB2 of the first common electrode CE1, are formed on the fourth insulation film 14 by using, for example, the same transparent, electrically conductive material, and are covered with the first alignment film AL1. The second main pixel electrode PA2 is located immediately above the first main pixel electrode PA1, and is located at a substantially middle point between the second main common electrode CAL2 and second main common electrode CAR2. The second sub-pixel electrode PB2 is located immediately above the first sub-pixel electrode PB1, and is located closer to the second sub-common electrode CBB2 than to the second sub-common electrode CBU2. The second main common electrode CAL2 is located immediately above the source line S1, and is displaced from a position immediately above the first main common electrode CAL1. The second main common electrode CAR2 is located immediately above the source line S2, and is displaced from a position immediately above the first main common electrode CAR1. The second sub-common electrode CBU2 is opposed to the first sub-common electrode CBU1 at a position immediately above the gate line G1, and the second sub-common electrode CBB2 is opposed to the first sub-common electrode CBB1 at a position immediately above the gate line G2.

The third main common electrode CAL3 is opposed to the second main common electrode CAL2. The electrode width of the third main common electrode CAL3 is equal to that of the second main common electrode CAL2, and is smaller than the line width of the source line S1. The third main common electrode CAR3 is opposed to the second main common electrode CAR2. The electrode width of the third main common electrode CARS is equal to that of the second main common electrode CAR2, and is smaller than the line width of the source line S2. The third sub-common electrode CBU3 is opposed to the second sub-common electrode CBU2, and the third sub-common electrode CBB3 is opposed to the second sub-common electrode CBB2.

According to the second structure example, the array substrate AR includes two layers of main common electrodes (first main common electrode CA1 and second main common electrode CA2) which have the same potential (e.g. common potential) on the liquid crystal layer LQ side of each source line S. The first main common electrode CA1, which is located in the lower layer, is located on the pixel electrode PE side of the source line S, and the second main common electrode CA2, which is located in the upper layer, is located immediately above the source line S. Since the first main common electrode CA1 and second main common electrode CA2 have the same potential, an equipotential surface is created between the first main common electrode CA1 and second main common electrode CA2. This equipotential surface shields an undesired leak electric field extending from the source line S located in the underlayer toward the liquid crystal layer LQ. Thus, the influence of an undesired electric field in that area of the transmissive region, which is close to the source line S, can be relaxed, and degradation in display quality can be suppressed.

In addition, in the pixel column between the source line S1 and source line S2, each pixel includes the first pixel electrode PE1 and second pixel electrode PE2. Thus, at the ON time, an electric field necessary for controlling the alignment of liquid crystal molecules is produced between the second pixel electrode PE2 and the second main common electrode CA2 and third main pixel electrode CA3, and a shield electric field is produced between the first pixel electrode PE1 and the first main common electrode CA1. This shield electric field shields an undesired leak electric field from the source line S due to a potential difference between the source line S and the second pixel electrode 2E2. Therefore, the production of an undesired electric field from the source line S can further be suppressed, and degradation in display quality can be suppressed.

Besides, since the first sub-common electrode CB1 is opposed to the gate line G, an undesired leak electric field from the gate line G can also be shielded.

In the meantime, although the first main common electrode CA1 and first sub-common electrode CB1 are located in the aperture portion AP, each of these electrodes is formed of a transparent, electrically conductive material, and the alignment of liquid crystal molecules LM, which are located immediately above the first main common electrode CA1 and first sub-common electrode CB1, is controlled by the electric field which is produced between the second pixel electrode PE2 and the second main common electrode CA2 and third main common electrode CA3. Thus, the transmittance in the aperture portion AP is not decreased. On the other hand, the electrode width of each of the second main common electrode CA2 and third main common electrode CA3 is smaller than the line width of the source line S, the region where the alignment of liquid crystal molecules LM can be controlled can be made larger than in the case where the electrode width of each of the second main common electrode CA2 and third main common electrode CA3 is greater than the line width of the source line S. In short, in the second structure example, the transmittance can be enhanced, compared to the case where the electrode width of each of the second main common electrode CA2 and third main common electrode CA3 is greater than the line width of the source line S.

In addition, according to the second structure example, the first main common electrode CA1, which is on the side close to the source line S, is disposed at a position displaced from a position immediately above the source line S. It is thus possible to suppress production of an undesired capacitance between the source line S and the first main common electrode CA1, and to reduce the power consumption of the liquid crystal display device. Furthermore, since the second main common electrode CA2, which is opposed to the source line S, is located at a greater distance from the source line S than the first main common electrode CA1, it is possible to reduce the influence upon display by the capacitance which may be produced between the source line S and the second main common electrode CA2.

In the meantime, the second structure example is not limited to the example as described above. For example, the pixel electrode PE may be only the first pixel electrode PE1 or only the second pixel electrode PE2. In this case, too, a shield electric field can be produced between the pixel electrode PE and the first main common electrode CA1, and an electric field for controlling the alignment of liquid crystal molecules LM can be produced between the pixel electrode PE and the second main common electrode CA2 and third main pixel electrode CA3.

Next, a third structure example of the present embodiment is described.

FIG. 11 is a plan view which schematically illustrates the third structure example of the pixel PX at a time when the array substrate AR shown in FIG. 1 is viewed from the counter-substrate side.

The third structure example differs from the above-described second structure example in that the first main common electrode CA1, which is provided on the array substrate AR, has an electrode width which is greater than the line width of the source line S. Since the pixel electrode PE is the same as in the second structure example, a description thereof is omitted here.

The first main common electrode CA1 extends along the source line S. The first main common electrode CA1 has an electrode width which is greater than the line width of the source line S, and extends to the pixel electrode PE side from a position overlapping the source line S. In the example illustrated, a first main common electrode CAL1 extends along the source line S1, is disposed at a position overlapping the source line S1, and extends to the pixel electrode PE side. A first main common electrode CAR1 extends along the source line S2, is disposed at a position overlapping the source line S2, and extends to the pixel electrode PE side.

The second main common electrode CA2 extends along the first main common electrode CA1. The second main common electrode CA2 has an electrode width which is smaller than the line width of the source line S, and is disposed at a position above the source line S, and is opposed to the first main common electrode CA1. In the example illustrated, a second main common electrode CAL2 extends along the first main common electrode CAL1, has an electrode width which is smaller than the line width of the source line S1, and is opposed to the first main common electrode CAL1 at a position above the source line S1. A second main common electrode CAR2 extends along the first main common electrode CAR1, has an electrode width which is smaller than the line width of the source line S2, and is opposed to the first main common electrode CAR1 at a position above the source line S2.

Since the first sub-common electrode CB1 and second sub-common electrode CB2 are the same as in the second structure example, a description thereof is omitted here.

The array substrate AR, which has been described in this third structure example, can be combined with the counter-substrate CT with the structure shown in FIG. 3.

Figure 13:
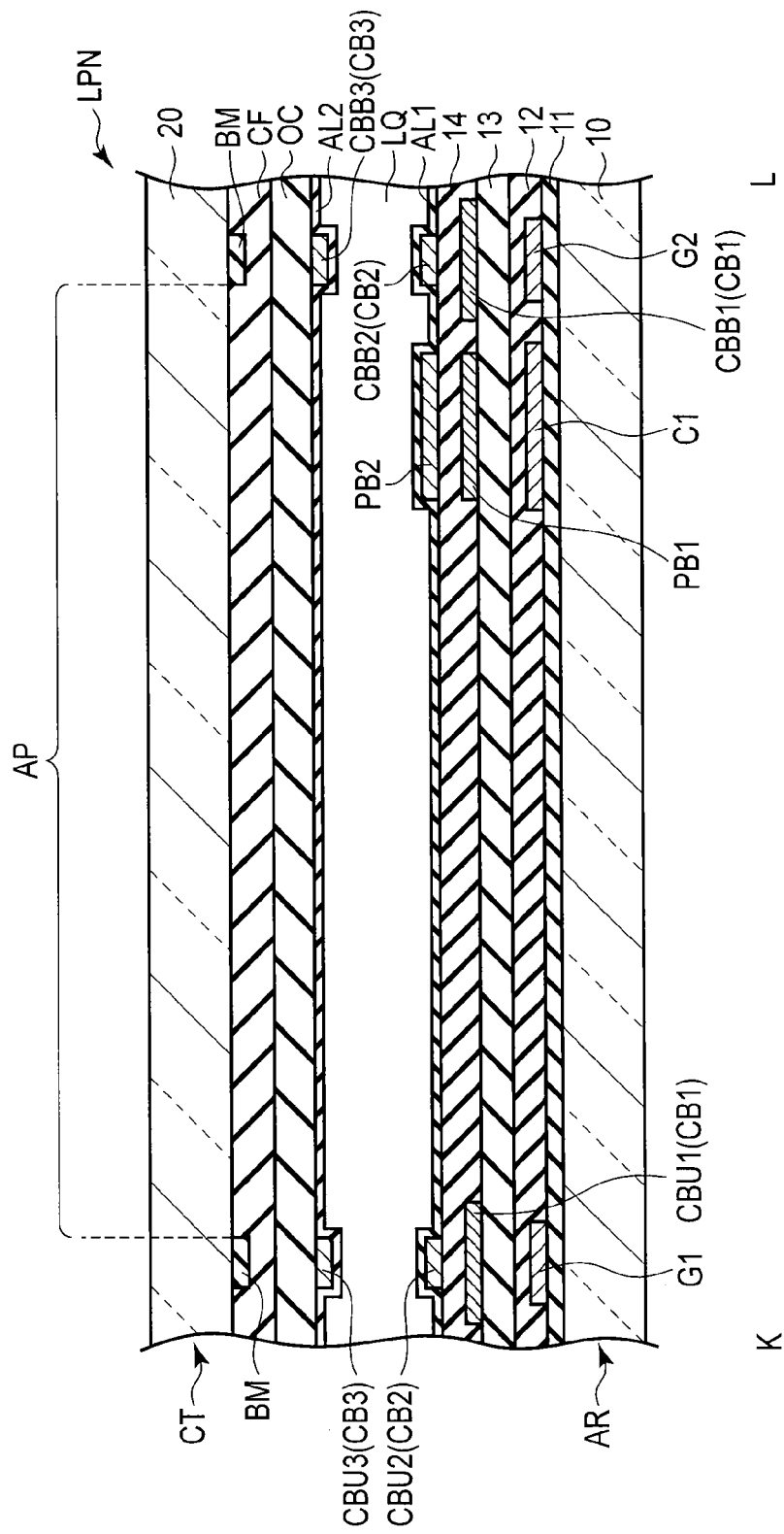
FIG. 13 is a cross-sectional view, taken along line K-L in FIG. 11, which shows, in a simplified fashion, a main part of a cross-sectional structure of the liquid crystal display panel shown in FIG. 11.

FIG. 12 is a cross-sectional view, taken along line I-J in FIG. 11, which shows, in a simplified fashion, a main part of a cross-sectional structure of a liquid crystal display panel LPN shown in FIG. 11. FIG. 13 is a cross-sectional view, taken along line K-L in FIG. 11, which shows, in a simplified fashion, a main part of a cross-sectional structure of the liquid crystal display panel LPN shown in FIG. 11. FIG. 12 and FIG. 13 show only parts which are necessary for the description. The differences from the second structure example will mainly be described.

The first main common electrode CAL1 is located immediately above the source line S1, and also extends to the first main pixel electrode PA1 side. The first main common electrode CAR1 is located immediately above the source line S2, and also extends to the first main pixel electrode PA1 side. The first sub-common electrode CBU1 is located immediately above the gate line G1, and also extends to the first sub-pixel electrode PB1 side. The first sub-common electrode CBB1 is located immediately above the gate line G2, and also extends to the first sub-pixel electrode PB1 side.

The second main common electrode CAL2 is opposed to the first main common electrode CAL1, immediately above the source line S1. The second main common electrode CAR2 is opposed to the first main common electrode CAR1, immediately above the source line S2. The second sub-common electrode CBU2 is opposed to the first sub-common electrode CBU1, immediately above the gate line G1. The second sub-common electrode CBB2 is opposed to the first sub-common electrode CBB1, immediately above the gate line G2.

According to the third structure example, the first main common electrode CA1 and second main common electrode CA2 are provided on the liquid crystal layer LQ side of each source line S. Since the first main common electrode CA1, which is located in the lower layer, is opposed to the source line S, the first main common electrode CA1 can also shield an undesired leak electric field from the source line S. Thus, the influence of an undesired electric field in that area of the transmissive region, which is close to the source line S, can be relaxed, and degradation in display quality can be suppressed.

In addition, in the pixel column between the source line S1 and source line S2, each pixel includes the first pixel electrode PE1 and second pixel electrode PE2. Thus, at the ON time, an electric field necessary for controlling the alignment of liquid crystal molecules is produced between the second pixel electrode PE2 and the second main common electrode CA2 and third main pixel electrode CA3, and a shield electric field is produced between the first pixel electrode PE1 and the first main common electrode CA1. This shield electric field shields an undesired leak electric field from the source line S due to a potential difference between the source line S and the second pixel electrode PE2. Therefore, the production of an undesired electric field from the source line S can further be suppressed, and degradation in display quality can be suppressed.

Besides, like the second structure example, since the first sub-common electrode CB1 is opposed to the gate line G, an undesired leak electric field from the gate line G can also be shielded.

Like the second structure example, since each of the first main common electrode CA1 and first sub-common electrode CB1 is formed of a transparent, electrically conductive material, the transmittance in the aperture portion AP is not decreased. In addition, since the electrode width of each of the second main common electrode CA2 and third main common electrode CA3 is smaller than the line width of the source line S, the region where the alignment of liquid crystal molecules LM can be controlled can be made larger than in the case where the electrode width of each of the second main common electrode CA2 and third main common electrode CA3 is greater than the line width of the source line S.

In the meantime, the third structure example is not limited to the example as described above.

Figure 14:
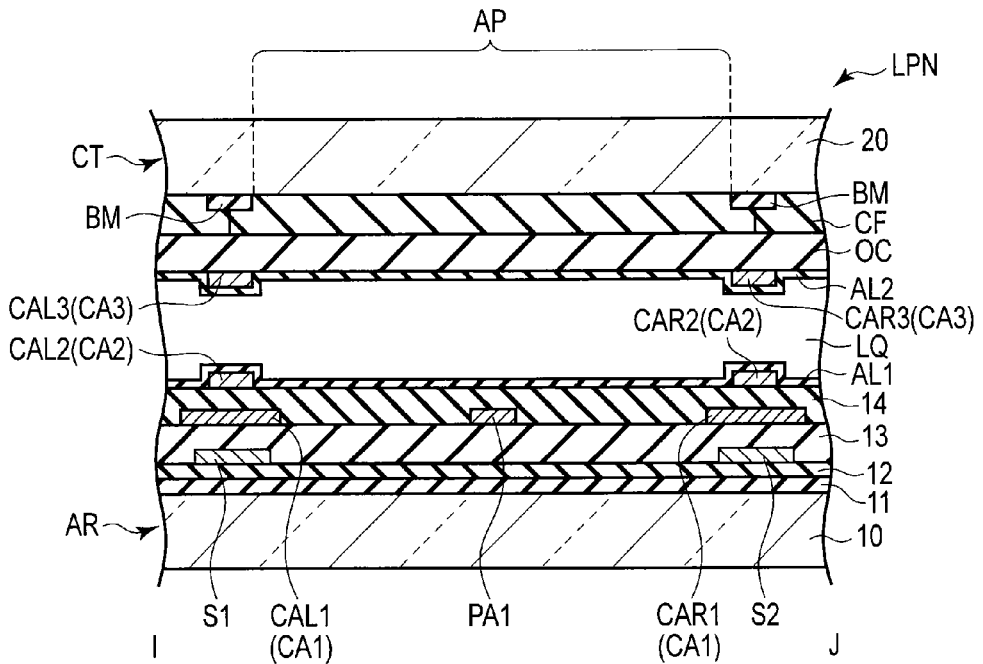
FIG. 14 is a cross-sectional view, taken along line I-J in FIG. 11, which shows, in a simplified fashion, a main part of another cross-sectional structure of the liquid crystal display panel shown in FIG. 11.

For example, as illustrated in FIG. 14, as regards the pixel electrode PE, the second pixel electrode PE2 may be omitted. In this case, too, the first main common electrode CA1 can shield a leak electric field from the source line S. In addition, it is possible to produce a shield electric field for shielding a leak electric field between the first main pixel electrode PA1 and the first main common electrode CA1, and to produce an electric field for controlling the alignment of liquid crystal molecules LM between the first main pixel electrode PA1 and the second main common electrode CA2 and third main pixel electrode CA3. Incidentally, in order to efficiently produce an electric field for controlling the alignment of liquid crystal molecules LM, it is desirable to make thinner the fourth insulation film 14 which covers the first main pixel electrode PA1.

Figure 15:
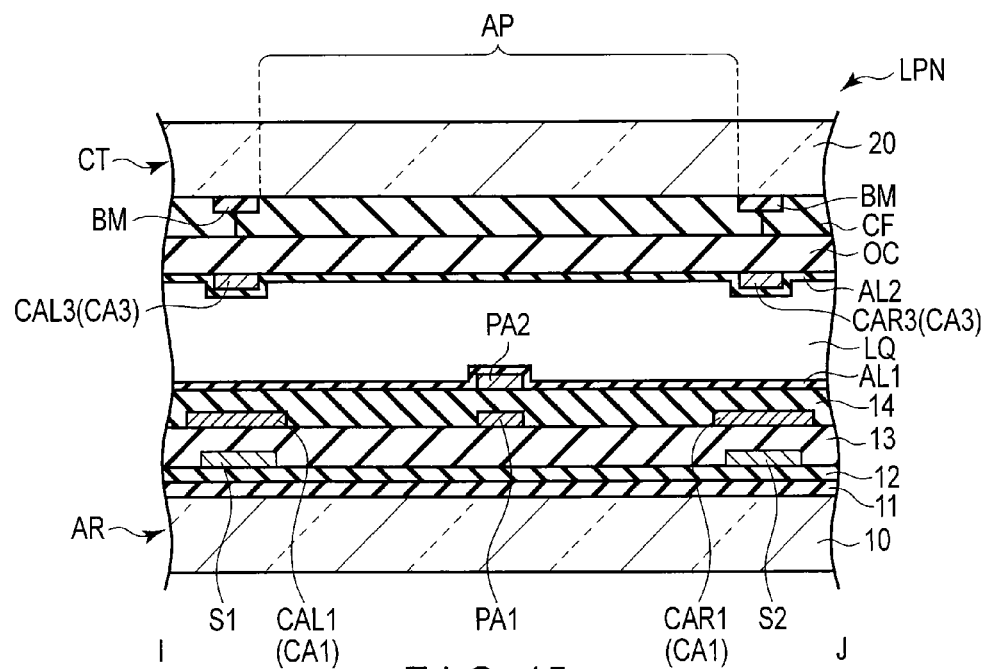
FIG. 15 is a cross-sectional view, taken along line I-J in FIG. 11, which shows, in a simplified fashion, a main part of another cross-sectional structure of the liquid crystal display panel shown in FIG. 11.

In addition, as shown in FIG. 15, as regards the first common electrode CE1 of the array substrate AR, the second main common electrode CA2 may be omitted. In this case, too, the first main common electrode CA1 can shield a leak electric field from the source line S. In addition, it is possible to produce a shield electric field for shielding a leak electric field between the first main pixel electrode PA1 and the first main common electrode CA1, and to produce an electric field for controlling the alignment of liquid crystal molecules LM between the second main pixel electrode PA2 and the third main common electrode CA3.

In the present embodiment, the description has been given of the liquid crystal display panel LPN which is configured such that the pixel electrodes PE are formed on the array substrate AR, and at least a part of the common electrode CE is formed on the counter-substrate CT. The above-described first to third structure examples, however, are also applicable to a liquid crystal display panel which is constructed by combining an array substrate on which the pixel electrodes PE and first common electrode CE1 are formed and a counter substrate CT on which no common electrode is formed.

Figure 16:
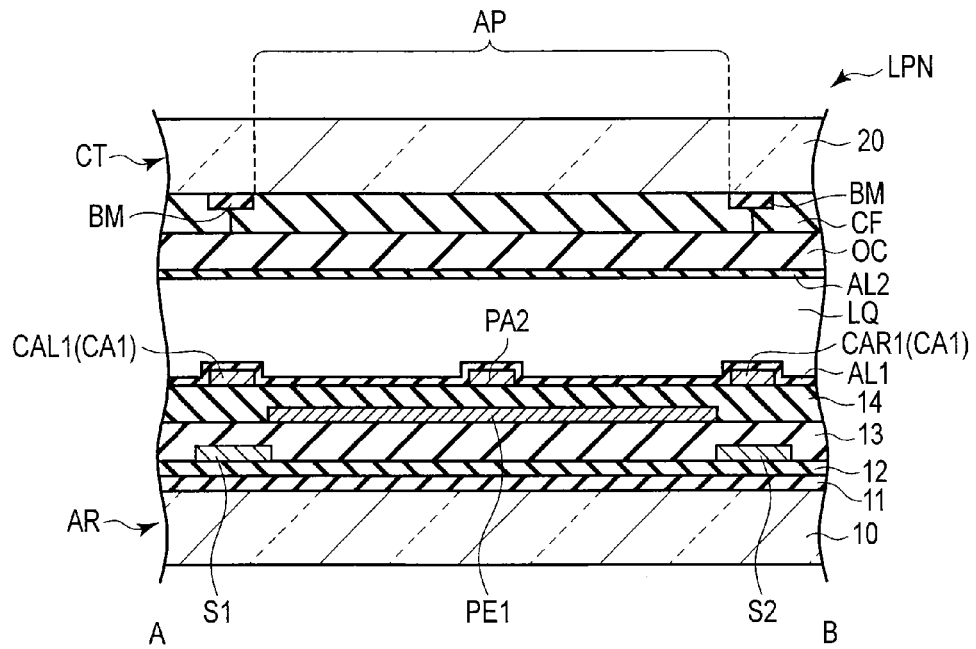
FIG. 16 is a cross-sectional view, taken along line A-B in FIG. 3, which shows, in a simplified fashion, a main part of another cross-sectional structure of the liquid crystal display panel shown in FIG. 3.

An example illustrated in FIG. 16 corresponds to a structure in which the second common electrode CE2 is omitted from the above-described first structure example. In this structure example, a leak electric field from the source line S is mainly shielded by the first pixel electrode PE1. In addition, the alignment of liquid crystal molecules LM is mainly controlled by an electric field which is produced between the second main pixel electrode PA2 and the first main common electrode CA1.

Figure 17:
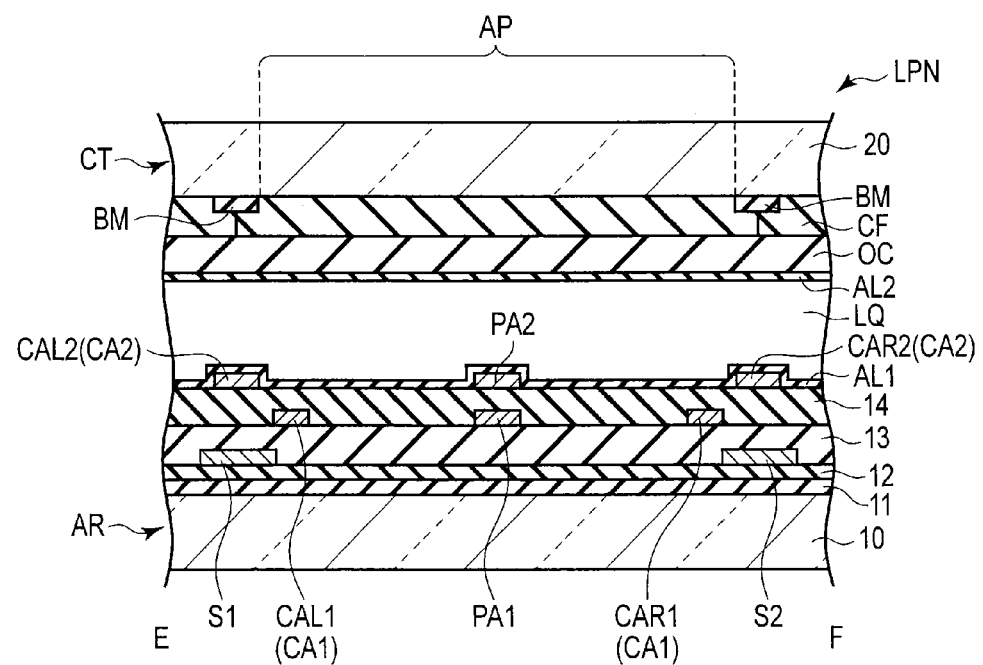
FIG. 17 is a cross-sectional view, taken along line E-F in FIG. 8, which shows, in a simplified fashion, a main part of another cross-sectional structure of the liquid crystal display panel shown in FIG. 8.

An example illustrated in FIG. 17 corresponds to a structure in which the second common electrode CE2 is omitted from the above-described second structure example. In this structure example, a leak electric field from the source line S is shielded by an equipotential surface between the first main common electrode CA1 and second main common electrode CA2, and by a shield electric field between the first main pixel electrode PA1 and the first main common electrode CA1. In addition, the alignment of liquid crystal molecules LM is mainly controlled by an electric field which is produced between the second main pixel electrode PA2 and the second main common electrode CA2.

Figure 18:
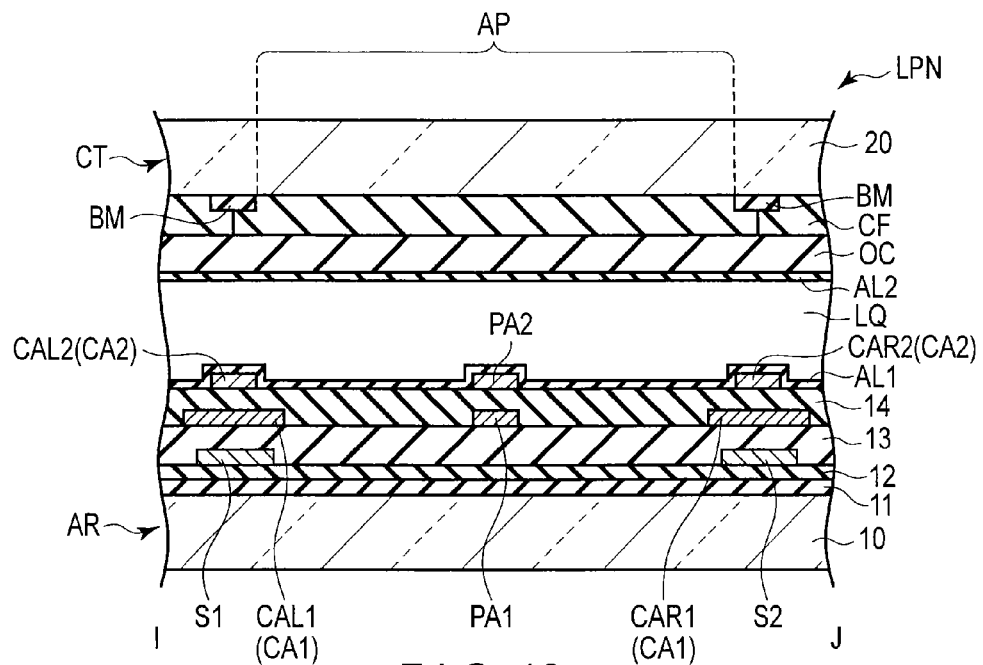
FIG. 18 is a cross-sectional view, taken along line I-J in FIG. 11, which shows, in a simplified fashion, a main part of another cross-sectional structure of the liquid crystal display panel shown in FIG. 11.

An example illustrated in FIG. 18 corresponds to a structure in which the second common electrode CE2 is omitted from the above-described third structure example. In this structure example, a leak electric field from the source line S is shielded by the first main common electrode CA1 itself, or by a shield electric field between the first main pixel electrode PA1 and the first main common electrode CA1. In addition, the alignment of liquid crystal molecules LM is mainly controlled by an electric field which is produced between the second main pixel electrode PA2 and the second main common electrode CA2.

Figure 19:
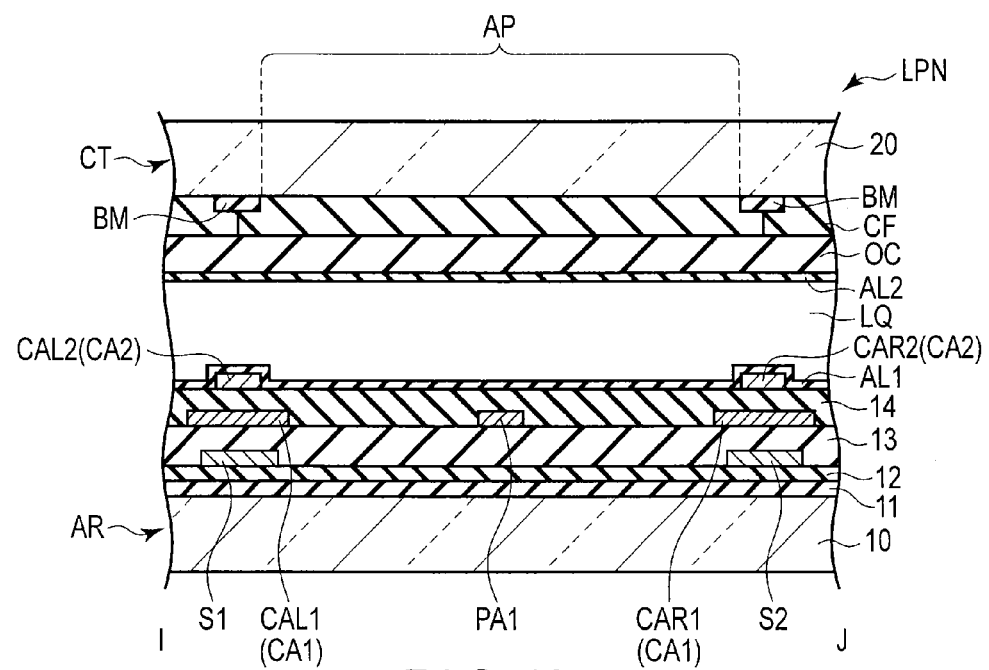
FIG. 19 is a cross-sectional view, taken along line I-J in FIG. 11, which shows, in a simplified fashion, a main part of another cross-sectional structure of the liquid crystal display panel shown in FIG. 11.

An example illustrated in FIG. 19 corresponds to a structure in which the second common electrode CE2 is omitted from the modification, shown in FIG. 14, of the above-described third structure example. In this structure example, a leak electric field from the source line S is shielded by the first main common electrode CA1 itself, or by a shield electric field between the first main pixel electrode PA1 and the first main common electrode CA1. In addition, the alignment of liquid crystal molecules LM is mainly controlled by an electric field which is produced between the first main pixel electrode PA1 and the second main common electrode CA2.

An example illustrated in FIG. 20 corresponds to a structure in which the second common electrode CE2 is omitted from the modification, shown in FIG. 15, of the above-described third structure example. In this structure example, a leak electric field from the source line S is shielded by the first main common electrode CA1 itself, or by a shield electric field between the first main pixel electrode PA1 and the first main common electrode CA1. In addition, the alignment of liquid crystal molecules LM is mainly controlled by an electric field which is produced between the second main pixel electrode PA2 and the first main common electrode CA1.

According to the structure examples illustrated in FIG. 16 to FIG. 20, in addition to the above-described advantageous effects, there is no need to form electrodes on the counter-substrate CT side. In addition, even if misalignment occurs when the array substrate AR and counter-substrate CT are attached, degradation in display quality can be suppressed.

Next, the advantageous effects of the present embodiment were verified.

FIG. 21 is a view for explaining the definition of a crosstalk ratio which is introduced in the present embodiment. Specifically, in the case where a rectangular window WDW was displayed at a substantially central part of the active area ACT and black display or white display was effected in the window WDW and intermediate-color display was effected on a peripheral part of the window WDW, luminances around the window WDW were measured. The luminances at four locations indicated in FIG. 21 were W1, W2, W3 and W4, respectively. In addition, in the case where the same intermediate color was displayed on the entirety of the same active area ACT, luminances at the same four locations as in the above case were measured. The luminances at the four locations indicated in FIG. 21 were G1, G2, G3 and G4, respectively. At this time, the crosstalk ratio is defined by:

$$\text{crosstalk ratio} = |W(n) - G(n)|/G(n) \times 100 \text{ (wherein } n = 1 \sim 4\text{)}$$

Crosstalk ratios were measured with respect to a comparative example, in which the first pixel electrode was omitted from the above-described first structure example, and with respect to the first structure example and second structure example of the present embodiment. When the crosstalk ratio of the comparative example was normalized to 1, the crosstalk ratio of the first structure example was 0.10, and the crosstalk ratio of the second structure example was 0.20. It was thus confirmed that according to the present embodiment, the crosstalk was successfully be decreased.

In addition, the inventor measured transmittances with respect to the above-described comparative example, first structure example and second structure example. When the transmittance of the comparative example was normalized to 1, the transmittance of the first structure example was 1.03, and the transmittance of the second structure example was 1.27. It was thus confirmed that according to the present embodiment, the transmittance was successfully be enhanced.

As has been described above, according to the present embodiment, a liquid crystal display device, which can suppress degradation in display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first gate line and a second gate line extending in a first direction, a first insulation film covering the first and second gate lines, a source line extending on the first insulation film in a second direction crossing the first direction, a second insulation film covering the source line, a switching element electrically connected to the first gate line and the source line, a first pixel electrode which is located on the second insulation film, extends to a position overlapping the second gate line, and is electrically connected to the switching element, a third insulation film covering the first pixel electrode, a second pixel electrode which is located on the third insulation film, is opposed to the first pixel electrode, is electrically connected to the first pixel electrode and includes a main pixel electrode extending in the second direction, and a first main common electrode extending along the source line, the first pixel electrode including an edge portion which is located closer to the source line and the first main common electrode than to the main pixel electrode;
a second substrate disposed to be opposed to the first substrate; and
a liquid crystal layer held between the first substrate and the second substrate,
wherein the first substrate further includes a first sub-common electrode which extends on the third insulation film in the first direction, is opposed to the first pixel electrode immediately above the second gate line, has a width greater than a width of the second gate line, and is continuous with the first main common electrode.

2. The liquid crystal display device of claim 1, wherein the first pixel electrode is formed in a rectangular shape, an H shape, or a grid shape.

3. The liquid crystal display device of claim 2, wherein the first pixel electrode is formed of a transparent, electrically conductive material.

4. The liquid crystal display device of claim 1, wherein the second pixel electrode is formed in a cross shape or a T shape.

5. The liquid crystal display device of claim 1, wherein the second substrate includes a third main common electrode which has a same potential as the first main common electrode and is located above the first main common electrode.

6. The liquid crystal display device of claim 1, wherein the second substrate further includes a third sub-common electrode which has a same potential as the first sub-common electrode, is located above the first sub-common electrode, and is continuous with the third main common electrode.

* * * * *